(12) United States Patent
Bennett et al.

(10) Patent No.: US 9,382,713 B2
(45) Date of Patent: *Jul. 5, 2016

(54) PANEL FOR SHEATHING SYSTEM AND METHOD

(71) Applicant: Huber Engineered Woods LLC, Commerce, GA (US)

(72) Inventors: John L. Bennett, Nicholson, GA (US); Joel F. Barker, Townville, SC (US); Rick D. Jordan, Lawrenceville, GA (US); Thomas L. Schuman, Jefferson, GA (US); Nian Ou, Dacula, GA (US); Neil C. Swiacki, Harrisburg, NC (US); Kelly R. Flaherty, Braselton, GA (US)

(73) Assignee: HUBER ENGINEERED WOODS LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,999

(22) Filed: Mar. 13, 2015

(65) Prior Publication Data

US 2015/0184382 A1 Jul. 2, 2015

Related U.S. Application Data

(63) Continuation of application No. 13/927,548, filed on Jun. 26, 2013, now Pat. No. 9,010,044, which is a continuation of application No. 13/326,401, filed on Dec. 15, 2011, now Pat. No. 8,474,197, which is a (Continued)

(51) Int. Cl.
| | | |
|---|---|---|
| *E04B 2/02* | (2006.01) | |
| *E04D 5/00* | (2006.01) | |
| *E04C 2/02* | (2006.01) | |
| *B32B 21/06* | (2006.01) | |
| *E04B 1/68* | (2006.01) | |
| *E04B 7/22* | (2006.01) | |
| *E04D 3/35* | (2006.01) | |
| *E04D 12/00* | (2006.01) | |
| *E04D 13/16* | (2006.01) | |
| *E04B 1/62* | (2006.01) | |
| *E04B 1/66* | (2006.01) | |
| *E04B 2/00* | (2006.01) | |

(52) U.S. Cl.
CPC . *E04C 2/02* (2013.01); *B32B 21/06* (2013.01); *E04B 1/625* (2013.01); *E04B 1/665* (2013.01);
(Continued)

(58) Field of Classification Search
CPC ............. E04B 7/22; E04B 1/68; E04D 3/355; E04D 12/00; E04D 13/1618; B32B 21/06
USPC ................. 52/408, 410, 741.4, 459, 177, 417, 52/798.1, 518, 588.1; 428/141, 156, 428/292.4, 292.7, 105, 107
See application file for complete search history.

(56) References Cited

U.S. PATENT DOCUMENTS 1,257,144 A 6/1916 Stanwood
2,044,782 A 6/1936 Harshberger
(Continued)

OTHER PUBLICATIONS

Co-Fair Products Inc Jan. 4, 2005.*
(Continued)

*Primary Examiner* — Beth Stephan
(74) *Attorney, Agent, or Firm* — Gardner Groff Greenwald & Villanueva, P.C.

(57) ABSTRACT

The panel includes a water resistant barrier layer secured atop its outward facing surface. The water resistant barrier layer includes a skid resistant surface. The panels are made of lignocellulosic material. The water resistant and skid resistant surface may include indicia for aligning strips of tape or for aligning fasteners. A method for manufacturing the water resistant building panels is also disclosed and includes the steps of feeding paper onto a forming belt, depositing lignocellulosic material and the binding agent onto the forming belt so as to form a lignocellulosic mat, applying heat and pressure so as to impart the skid resistant surface on the paper, and cutting panels to predetermined sizes.

14 Claims, 13 Drawing Sheets

Related U.S. Application Data continuation of application No. 12/987,125, filed on Jan. 9, 2011, now Pat. No. 8,112,950, which is a continuation of application No. 12/647,249, filed on Dec. 24, 2009, now Pat. No. 7,877,938, which is a continuation of application No. 11/029,535, filed on Jan. 4, 2005, now Pat. No. 7,658,040, said application No. 12/987,125 is a continuation of application No. 12/722,787, filed on Mar. 12, 2010, now Pat. No. 7,870,694, which is a continuation of application No. 11/029,293, filed on Jan. 4, 2005, now Pat. No. 7,721,506, said application No. 12/987,125 is a continuation-in-part of application No. 12/701,260, filed on Feb. 5, 2010, now Pat. No. 7,866,100, which is a continuation of application No. 11/029,300, filed on Jan. 4, 2005, now Pat. No. 7,677,002.

(60) Provisional application No. 60/547,029, filed on Feb. 23, 2004, provisional application No. 60/547,031, filed on Feb. 23, 2004.

(52) U.S. Cl.
CPC ... *E04B 1/68* (2013.01); *E04B 7/22* (2013.01); *E04C 2/46* (2013.01); *E04D 3/35* (2013.01); *E04D 3/355* (2013.01); *E04D 12/00* (2013.01); *E04D 13/1618* (2013.01); *Y10T 29/49629* (2015.01); *Y10T 428/24355* (2015.01); *Y10T 428/249982* (2015.04)

(56) References Cited

U.S. PATENT DOCUMENTS

| | | |
|---|---|---|
| 2,144,168 A | 1/1939 | Sherriff |
| 2,226,239 A | 12/1940 | Elmendorf |
| 2,246,514 A | 6/1941 | Harris |
| 3,041,219 A | 6/1962 | Steck |
| 3,111,787 A | 11/1963 | Chamberlain |
| 3,448,001 A | 6/1969 | Jarvi et al. |
| 3,468,086 A | 9/1969 | Warner |
| 3,522,138 A | 7/1970 | Lee |
| 3,654,044 A | 4/1972 | Hirota |
| 3,900,102 A | 8/1975 | Hurst |
| 3,909,998 A | 10/1975 | Simpson et al. |
| 3,969,181 A | 7/1976 | Seabold |
| 4,021,981 A | 5/1977 | Wagoner |
| 4,053,339 A | 10/1977 | Story et al. |
| 4,132,220 A | 1/1979 | Thomason |
| 4,160,346 A | 7/1979 | Kaufmann |
| 4,172,830 A | 10/1979 | Rosenberg et al. |
| 4,194,335 A | 3/1980 | Diamond |
| 4,326,909 A | 4/1982 | Slavik |
| 4,404,252 A | 9/1983 | Hetzler et al. |
| 4,405,675 A | 9/1983 | Dessens |
| 4,601,935 A | 7/1986 | Metcalf et al. |
| 4,689,275 A | 8/1987 | Sandman |
| 4,775,567 A | 10/1988 | Harkness |
| 4,825,616 A | 5/1989 | Bondoc et al. |
| 4,828,635 A | 5/1989 | Flack et al. |
| 4,888,930 A | 12/1989 | Kelly |
| 4,924,644 A | 5/1990 | Lewis |
| 4,929,303 A | 5/1990 | Sheth |
| 4,936,071 A | 6/1990 | Karrfalt |
| 4,937,992 A | 7/1990 | Dawson et al. |
| 4,965,119 A | 10/1990 | Sancaktar |
| 4,974,382 A | 12/1990 | Avellanet |
| 4,992,315 A | 2/1991 | Zickell et al. |
| 4,992,331 A | 2/1991 | DeCoste |
| 4,999,064 A | 3/1991 | Knaepen |
| 5,093,185 A | 3/1992 | Ungar et al. |
| 5,096,759 A | 3/1992 | Simpson et al. |
| 5,134,831 A | 8/1992 | Avellant |
| 5,187,000 A | 2/1993 | Chow et al. |
| 5,231,814 A | 8/1993 | Hageman |
| 5,236,757 A | 8/1993 | Probst et al. |
| 5,251,416 A | 10/1993 | White |
| 5,270,119 A | 12/1993 | Yanutola |
| 5,335,473 A | 8/1994 | Chase |
| 5,374,477 A | 12/1994 | Lawless et al. |
| 5,425,976 A | 6/1995 | Clarke et al. |
| 5,497,596 A | 3/1996 | Zatkulak |
| 5,515,659 A | 5/1996 | MacDonald et al. |
| 5,617,687 A | 4/1997 | Bussey et al. |
| 5,632,095 A | 5/1997 | Day |
| 5,647,934 A | 7/1997 | Vaders et al. |
| 5,661,937 A | 9/1997 | Doppler et al. |
| 5,687,517 A | 11/1997 | Wiercinski et al. |
| 5,700,570 A | 12/1997 | Fahmy |
| 5,711,124 A | 1/1998 | Stough et al. |
| 5,718,786 A | 2/1998 | Lindquist et al. |
| 5,759,670 A | 6/1998 | Bussey et al. |
| 5,766,721 A | 6/1998 | Bussey et al. |
| 5,787,665 A | 8/1998 | Carlin et al. |
| 5,822,940 A | 10/1998 | Carlin et al. |
| 5,837,620 A | 11/1998 | Kajander |
| 5,843,552 A | 12/1998 | Karrfalt |
| 5,859,114 A | 1/1999 | Davis |
| 5,881,521 A | 3/1999 | Porter et al. |
| 5,891,282 A | 4/1999 | Stough et al. |
| 5,955,203 A | 9/1999 | Briggs |
| 5,989,668 A | 11/1999 | Nelson et al. |
| 6,023,906 A | 2/2000 | Folkersen |
| 6,120,869 A | 9/2000 | Cotsakis et al. |
| 6,131,353 A | 10/2000 | Egan |
| 6,133,168 A | 10/2000 | Doyle et al. |
| 6,187,127 B1 | 2/2001 | Bolitsky et al. |
| 6,209,283 B1 | 4/2001 | Folkersen |
| 6,226,946 B1 | 5/2001 | Stough et al. |
| 6,235,365 B1 | 5/2001 | Schaughency et al. |
| 6,251,495 B1 | 6/2001 | Wilson et al. |
| 6,253,530 B1 | 7/2001 | Price et al. |
| 6,279,284 B1 | 8/2001 | Moras |
| 6,293,069 B1 | 9/2001 | Monda et al. |
| 6,303,207 B1 | 10/2001 | Kajander |
| 6,308,491 B1 | 10/2001 | Porter |
| 6,331,339 B1 | 12/2001 | Kajander |
| 6,355,333 B1 | 3/2002 | Waggoner et al. |
| 6,434,897 B1 | 8/2002 | Sievers et al. |
| 6,455,151 B1 | 9/2002 | Sakashita et al. |
| 6,460,304 B1 | 10/2002 | Kim |
| 6,516,580 B1 | 2/2003 | Maietta |
| 6,578,331 B1 | 6/2003 | Leslie et al. |
| 6,581,348 B2 | 6/2003 | Hunter |
| 6,656,858 B1 | 12/2003 | Cahill |
| 6,673,417 B1 | 1/2004 | Gudet |
| 6,675,544 B1 | 1/2004 | Ou et al. |
| 6,701,685 B2 | 3/2004 | Rippey |
| 6,715,249 B2 | 4/2004 | Rusek et al. |
| 6,737,155 B1 | 5/2004 | Ou |
| 6,769,215 B1 | 8/2004 | Carkner |
| 6,772,569 B2 | 8/2004 | Bennett et al. |
| 6,800,352 B1 | 10/2004 | Hejna et al. |
| 6,804,922 B1 | 10/2004 | Egan |
| 6,854,228 B2 | 2/2005 | Arseneau et al. |
| 6,868,643 B1 | 3/2005 | Williams |
| 6,892,498 B1 | 5/2005 | Roman |
| 6,901,712 B2 | 6/2005 | Lionel |
| 6,925,766 B2 | 8/2005 | Di Pede |
| 6,926,785 B2 | 8/2005 | Tanzer et al. |
| 6,988,343 B2 | 1/2006 | Gleeson et al. |
| 7,021,018 B2 | 4/2006 | Peng |
| 7,037,864 B2 | 5/2006 | Faucher |
| 7,148,160 B2 | 12/2006 | Porter |
| 7,150,128 B2 | 12/2006 | Schuman et al. |
| 7,155,868 B2 | 1/2007 | Cole et al. |
| 7,159,368 B2 | 1/2007 | Peng |
| 7,378,044 B1 | 5/2008 | Hejna et al. |
| 7,487,624 B2 | 2/2009 | Baba |
| 7,501,357 B2 | 3/2009 | Carroll et al. |
| 7,550,187 B2 | 6/2009 | Seth et al. |
| 7,658,040 B2 | 2/2010 | Bennett et al. |
| 7,677,002 B2 | 3/2010 | Bennett et al. |
| 7,721,506 B2 | 5/2010 | Bennett et al. |

(56) References Cited

U.S. PATENT DOCUMENTS

| | | | |
|---|---|---|---|
| 7,829,197 | B2 | 11/2010 | Chen et al. |
| 7,838,104 | B2 | 11/2010 | Chen et al. |
| 7,838,123 | B2 | 11/2010 | Chen et al. |
| 7,866,100 | B2 | 1/2011 | Bennett et al. |
| 7,870,694 | B2 | 1/2011 | Bennett et al. |
| 7,877,938 | B2 | 2/2011 | Bennett et al. |
| 7,972,981 | B2 | 7/2011 | Anderson et al. |
| 7,984,591 | B2 | 7/2011 | Cashin et al. |
| 8,112,950 | B2 | 2/2012 | Bennett et al. |
| 8,215,083 | B2 | 7/2012 | Toas et al. |
| 8,222,164 | B2 | 7/2012 | Anderson et al. |
| 8,328,968 | B2 | 12/2012 | Anderson et al. |
| 8,474,197 | B2 | 7/2013 | Bennett et al. |
| 8,590,217 | B2 | 11/2013 | Gleeson et al. |
| 8,590,267 | B2 | 11/2013 | Jaffee |
| 9,010,044 | B2 * | 4/2015 | Bennett et al. .................. 52/177 |
| 2001/0010141 | A1 | 8/2001 | Folkersen |
| 2001/0021448 | A1 | 9/2001 | Kajander |
| 2001/0028943 | A1 | 10/2001 | Mashiko et al. |
| 2002/0018908 | A1 | 2/2002 | Smith et al. |
| 2002/0100249 | A1 | 8/2002 | Peng et al. |
| 2002/0132547 | A1 | 9/2002 | Grondin et al. |
| 2003/0054127 | A1 | 3/2003 | Heifetz |
| 2003/0079431 | A1 | 5/2003 | Schuman et al. |
| 2003/0113534 | A1 | 6/2003 | Poisson |
| 2003/0126817 | A1 | 7/2003 | Gleeson et al. |
| 2003/0129348 | A1 | 7/2003 | Peng |
| 2003/0131550 | A1 | 7/2003 | Cole et al. |
| 2003/0199217 | A1 | 10/2003 | Cashin et al. |
| 2004/0029469 | A1 | 2/2004 | Anderson et al. |
| 2004/0071927 | A1 | 4/2004 | Murphy et al. |
| 2004/0103608 | A1 | 6/2004 | Lionel |
| 2004/0180195 | A1 | 9/2004 | Macuga |
| 2004/0226247 | A1 | 11/2004 | Byrd |
| 2005/0011155 | A1 | 1/2005 | Ponting et al. |
| 2005/0016088 | A1 | 1/2005 | Pursall et al. |
| 2005/0118446 | A1 | 6/2005 | Faucher |
| 2006/0019568 | A1 | 1/2006 | Toas et al. |
| 2006/0034381 | A1 | 2/2006 | Ionescu et al. |
| 2006/0048464 | A1 | 3/2006 | Suzuki et al. |
| 2006/0053737 | A1 | 3/2006 | Jaffee |
| 2006/0053738 | A1 | 3/2006 | Jaffee |
| 2006/0053739 | A1 | 3/2006 | Jaffee |
| 2006/0059852 | A1 | 3/2006 | Toas et al. |
| 2006/0141191 | A1 | 6/2006 | Seth et al. |
| 2007/0015424 | A1 | 1/2007 | Toas et al. |
| 2007/0044397 | A1 | 3/2007 | Wiercinski et al. |
| 2007/0130867 | A1 | 6/2007 | Flaherty |
| 2007/0178793 | A1 | 8/2007 | Gerello |
| 2008/0141604 | A1 | 6/2008 | Arthurs et al. |
| 2008/0145681 | A1 | 6/2008 | Toas et al. |
| 2008/0190048 | A1 | 8/2008 | Kitakado |
| 2009/0202852 | A1 | 8/2009 | Chen |
| 2011/0135879 | A1 | 6/2011 | Bennett et al. |
| 2011/0197528 | A1 | 8/2011 | Egan et al. |
| 2011/0269363 | A1 | 11/2011 | Cashin et al. |
| 2013/0026172 | A1 | 1/2013 | Asakawa et al. |
| 2013/0082414 | A1 | 4/2013 | Anderson et al. |
| 2013/0283715 | A1 | 10/2013 | Bennett et al. |

OTHER PUBLICATIONS

Huber Engineered Woods, PerformMAX™ 500 Product Sheet (Huber Reference HUB 208), first sale date Sep. 21, 2000.
Huber Engineered Woods tri-fold pamphlets with product overview including PerformMAX™ (Huber Reference HUB 22), first sale date Sep. 21, 2000.
CoFair Products, Inc., Tite-Seal™ Self-Adhesive Waterproof Flashing Flyer, Jan. 4, 2005.
Arnold et al., Installing Housewrap, When properly detailed, high-tech wrappings can reduce the flow of air into outside walls while allowing moisture to escape, Fine Homebuilding, Feb./Mar. 1997, No. 107, pp. 44-47.
Energy Source Builder, Wall Sheathing Seam Tape, Oikos, Energy Source Builder #39, Jun. 1994, Iris Communications, Inc.
Information Disclosure Statement, filed by Georgia-Pacific on Apr. 13, 2015 under U.S. Appl. No. 14/065,580, 14 pages.
U.S. Appl. No. 60/547,029, filed Feb. 23, 2004, Bennett et al., provisional application.
U.S. Appl. No. 60/547,031, filed Feb. 23, 2004, Bennett et al., provisional application.
Bennett; U.S. Patent Application entitled: Panelized Roofing System and Method, filed Jan. 4, 2005 under U.S. Appl. No. 11/029,293.
Bennett; U.S. Patent Application entitled: Wall Sheathing System and Method of Installation, filed Jan. 4, 2005 under U.S. Appl. No. 11/029,300.
Bennett; U.S. Patent Application entitled: Panel for Sheathing Systems and Method, filed Jan. 4, 2005 under U.S. Appl. No. 11/029,535.
Bennett; Non-Final Office Action for U.S. Appl. No. 11/029,535, filed Jan. 4, 2005, mailed Dec. 12, 2007.
Bennett; Non-Final Office Action for U.S. Appl. No. 11/029,300, filed Jan. 4, 2005, mailed Dec. 13, 2007.
Bennett; Supplemental Non-Final Office Action for U.S. Appl. No. 11/029,293, filed Jan. 4, 2005, mailed Jun. 12, 2008.
Final Office Action mailed Mar. 2, 2009, U.S. Appl. No. 11/029,293, filed Jan. 4, 2005, Title: "Panelized Roofing System and Method," First Named Inventor: John L. Bennett.
Final Office Action mailed Mar. 2, 2009, U.S. Appl. No. 11/029,300, filed Jan. 4, 2005, Title "Wall Sheathing System and Method of Installation," First Named Inventor: John L. Bennett.
Non-Final Office Action mailed Mar. 17, 2009, U.S. Appl. No. 11/029,535, filed Jan. 4, 2005, Title: "Panel for Sheathing System and Method," First Named Inventor: John L. Bennett.
Non-Final Office Action mailed Jun. 19, 2009, U.S. Appl. No. 11/029,293, filed Jan. 4, 2005, Title: "Panelized Roofing System and Method," First Named Inventor: John L. Bennett.
Bennett; Notice of Allowance for U.S. Appl. No. 11/029,300, filed Jan. 4, 2005, mailed Jun. 26, 2009.
Bennett; Notice of Allowance for U.S. Appl. No. 11/029,535, filed Jan. 4, 2005, mailed Sep. 21, 2009.
Bennett; Notice of Allowance for U.S. Appl. No. 11/029,300, filed Jan. 4, 2005, mailed Oct. 13, 2009.
Bennett; U.S. Patent Application entitled: Panel for Sheathing System and Method, filed Dec. 24, 2009 under U.S. Appl. No. 12/647,249.
Bennett; Notice of Allowance for U.S. Appl. No. 11/029,293, filed Jan. 4, 2005, mailed Jan. 11, 2010.
Bennett.; U.S. Patent Application entitled: Wall Sheathing System and Method of Installation, filed Feb. 5, 2010 under U.S. Appl. No. 12/701,260.
Bennett; U.S. Patent Application entitled: Panelized Roofing System and Method, filed Mar. 12. 2010 under U.S. Appl. No. 12/722,787.
Bennett; Non-Final Office Action for U.S. Appl. No. 12/701,260, filed Feb. 5, 2010, mailed Apr. 22, 2010.
Bennett; Non-Final Office Action for U.S. Appl. No. 12/722,787, filed Mar. 12, 2010, mailed Apr. 22, 2010.
Bennett; Non-Final Office Action for U.S. Appl. No. 12/647,249, Dec. 24, 2009, mailed May 11, 2010.
Bennett; Notice of Allowance for U.S. Appl. No. 12/701,260, filed Feb. 5, 2010, mailed Oct. 12, 2010.
Bennett; Notice of Alloyvance for U.S. Appl. No. 12/647,249, filed Dec. 24, 2009, mailed Oct. 18, 2010.
Bennett; Notice of Allowance for U.S. Appl. No. 12/722,787, filed Mar. 12, 2010, mailed Nov. 8, 2010.
Bennett; U.S. Patent Application entitled: Panel for Sheathing System and Method, filed Jan. 9, 2011 under U.S. Appl. No. 12/987,125.
Bennett; Non-Final Office Action for U.S. Appl. No. 12/987,125, filed Jan. 9, 2011, mailed Aug. 9, 2011.
Bennett; Notice of Allowance for U.S. Appl. No. 12/987,125, filed Jan. 9, 2011, mailed Nov. 15, 2011.

* cited by examiner

PANEL FOR SHEATHING SYSTEM AND METHOD

CROSS-REFERENCE TO RELATED APPLICATIONS

This application is a continuation of U.S. patent application Ser. No. 13/927,548 filed Jun. 26, 2013, which is a continuation of U.S. patent application Ser. No. 13/326,401 filed Dec. 15, 2011, now U.S. Pat. No. 8,474,197 issued Jul. 2, 2013, which is a continuation of U.S. patent application Ser. No. 12/987,125 filed Jan. 9, 2011, now U.S. Pat. No. 8,112,950 issued Feb. 14, 2012. The '950 patent is a continuation of U.S. patent application Ser. No. 12/647,249 filed Dec. 24, 2009, now U.S. Pat. No. 7,877,938 issued Feb. 1, 2011, which is a continuation of U.S. patent application Ser. No. 11/029,535 filed Jan. 4, 2005, now U.S. Pat. No. 7,658,040 issued Feb. 9, 2010, which claims the priority benefit of U.S. Patent Application No. 60/547,029 filed Feb. 23, 2004, and U.S. Patent Application No. 60/547,031 filed Feb. 23, 2004. The '950 patent is also a continuation of U.S. patent application Ser. No. 12/722,787 filed Mar. 12, 2010, now U.S. Pat. No. 7,870,694 issued Jan. 18, 2011, which is a continuation of U.S. patent application Ser. No. 11/029,293 filed Jan. 4, 2005, now U.S. Pat. No. 7,721,506 issued May 25, 2010, which claims the priority benefit of U.S. Patent Application No. 60/547,029 filed Feb. 23, 2004, and U.S. Patent Application No. 60/547,031 filed Feb. 23, 2004. And the '950 patent is a continuation-in-part of U.S. patent application Ser. No. 12/701,260 filed Feb. 5, 2010, now U.S. Pat. No. 7,866,100 issued Jan. 11, 2011, which is a continuation of U.S. patent application Ser. No. 11/029,300 filed Jan. 4, 2005, now U.S. Pat. No. 7,677,002 issued Mar. 16, 2010, which claims the priority benefit of U.S. Patent Application No. 60/547,029 filed Feb. 23, 2004, and U.S. Patent Application No. 60/547,031 filed Feb. 23, 2004. The disclosures of all of the above priority documents are incorporated herein by reference for all purposes.

FIELD OF THE INVENTION

The present invention relates to sheathing systems and, more particularly, to sheathing systems for roofs and walls utilizing moisture resistant and skid resistant panels.

BACKGROUND

The roof of a residential or commercial building is typically constructed by attaching several roofing panels to the rafters of an underlying supporting structural frame; the panels are most often placed in a quilt-like pattern with the edge of each panel contacting the edges of adjacent panels so as to form a substantially continuous flat surface atop the structural frame.

However, problems with roofs constructed according to this method may present themselves. In particular, small gaps along the edges of adjoining roofing panels remain after roof assembly. Because the roofing panels are typically installed days or even weeks before shingles are installed, it is important to have a panel system that minimizes leakage resulting from exposure to the elements until such time as the roof is completed. To prevent water from leaking through the gaps between panels, it is commonly known in the industry to put a water resistant barrier layer on top of the roofing panels (e.g., felt paper). Accordingly, there is a need in the art for roofing panels, which can be conveniently fit together and yet are constructed to minimize the gaps or allow the gaps to be sealed between adjacent roofing panels to prevent or minimize the penetration of bulk water through the roof as it travels over the roof's surface. It is desirable for roofing panels to shed precipitation, such as rain and snow, during construction so that the interior remains dry.

While it is important that the barrier layer shed bulk water, it should also allow for the escape of water vapor. If the barrier were to trap water vapor in a roofing panel, the build-up of moisture could lead to rot or mold growth that is undesirable. As mentioned previously, it is known in the art that substantial bulk water-impermeability of installed roofing panels is achieved by adding a layer of impermeable material, such as asphalt-impregnated roofing paper or felt over the external surface of the roof panels. However, while this provides additional protection against bulk water penetration, it has the disadvantage of being difficult and time-consuming to install because the paper or felt must be first unrolled and spread over the roof surface and then secured to those panels. Further, the use of a felt paper overlay often results in a slick or slippery surface, especially when wet. Additionally, when the felt paper is not securely fastened to the roof panels or becomes loose due to wind and other weather conditions or because of poor construction methods, the roof system can become very slippery and leak bulk water. Accordingly, a worker walking atop the felt paper must be careful to avoid slipping or sliding while thereon. To that end, the present invention provides a panel for a roof sheathing system comprising structural panels, a mass-transfer barrier, and seam sealing means that is advantageously bulk water resistant and that exhibits adequate anti skid characteristics.

In addition to roof panel systems, wall panel construction systems of residential or commercial buildings do not typically provide simple, efficient, and safe means of installation. Known wall systems are frequently slick and do not provide adequate traction to securely support a ladder leaning thereon. Further, most often in these systems, an extra step must typically be added to the installation process to prevent liquid moisture and air from passing through the wall. Specifically, constructing a wall with a weather barrier requires not only that panels be attached to framing members, but also a house wrap is unrolled and spread over the walls. The house wrap is attached to the sheathing panels with staples or button cap nails and fenestration openings for windows or doors must be cut out of the wrap and the flaps from these openings folded back and stapled down. The house wrap is often difficult to install because it is typically in nine-ft wide rolls, which can be difficult to maneuver by workers on scaffolding or in windy conditions. Accordingly, there is also need in the art for wall-sheathing panels, which are moisture vapor permeable, skid-resistant and which create a simplified, safe, and time-saving installation process by means of a surface overlay member or coating permanently bonded thereon. To that end, the present invention also provides a panel for a wall sheathing system comprising structural panels, a mass-transfer barrier, and seam sealing means.

Accordingly, another general object of this invention is to provide a wall system that provides a barrier to bulk water, water vapors, air and heat transfer, irritants, insects and mold that can be permeable to moisture movement and is suitable for use behind numerous exterior finishes, such as siding, EIFS, brick, stucco, lap siding, vinyl, and the like.

Furthermore, the wall assembly consists of a simple process. Panels are affixed with a barrier layer and fastened to a building frame in a side-by-side manner, with or without a tongue and groove connection. Next, a sealing means, such as tape, laminate, caulk, foam, spray, putty, mechanical means, or any other suitable sealing mechanism, is used to seal the joints or seams between adjoining panels, thus completing the moisture barrier.

Given the foregoing, there is a continuing need to develop improved panels for roof and wall construction that prevent or minimize the penetration of bulk water, that come pre-equipped with a water permeable barrier layer applied during manufacture, and that have a skid resistant surface.

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown in the drawings, and that for purposes of illustration, these figures are not necessarily drawn to scale.

DETAILED DESCRIPTION OF EXAMPLE EMBODIMENTS

All parts, percentages and ratios used herein are expressed by weight unless otherwise specified. All documents cited herein are incorporated by reference.

As used herein, "wood" is intended to mean a cellular structure, having cell walls composed of cellulose and hemi-cellulose fibers bonded together by lignin polymer. "Wafer board" is intended to mean panels manufactured from reconstituted wood wafers bonded with resins under heat and pressure.

By "wood composite material" it is meant a composite material that comprises wood and one or more other additives, such as adhesives or waxes. Non-limiting examples of wood composite materials include oriented strand board ("OSB"), waferboard, particleboard, chipboard, medium-density fiberboard, plywood, and boards that are a composite of strands and ply veneers. As used herein, "flakes" and "strands" are considered equivalent to one another and are used interchangeably. A non-exclusive description of wood composite materials may be found in the Supplement Volume to the Kirk-Othmer Encyclopedia of Chemical Technology, pp. 765-810, $6^{th}$ edition.

As used herein, "structural panel" is intended to mean a panel product composed primarily of wood which, in its commodity end use, is essentially dependent upon certain mechanical and/or physical properties for successful end use performance such as plywood. A non-exclusive description may be found in the PS-2-92 Voluntary Product Standard.

The following describes preferred embodiments of the present invention which provides panels for a panelized roofing system, attached to the rafters of a timber frame structure to form a roof, and that is suitable for use in the construction of residential and commercial buildings. In addition, an alternate embodiment of the present invention, which provides panels for a panelized wall sheathing system that is suitable for use in the construction of residential and commercial buildings is shown and described.

Use of Panel for Roof Sheathing

Figure 1:
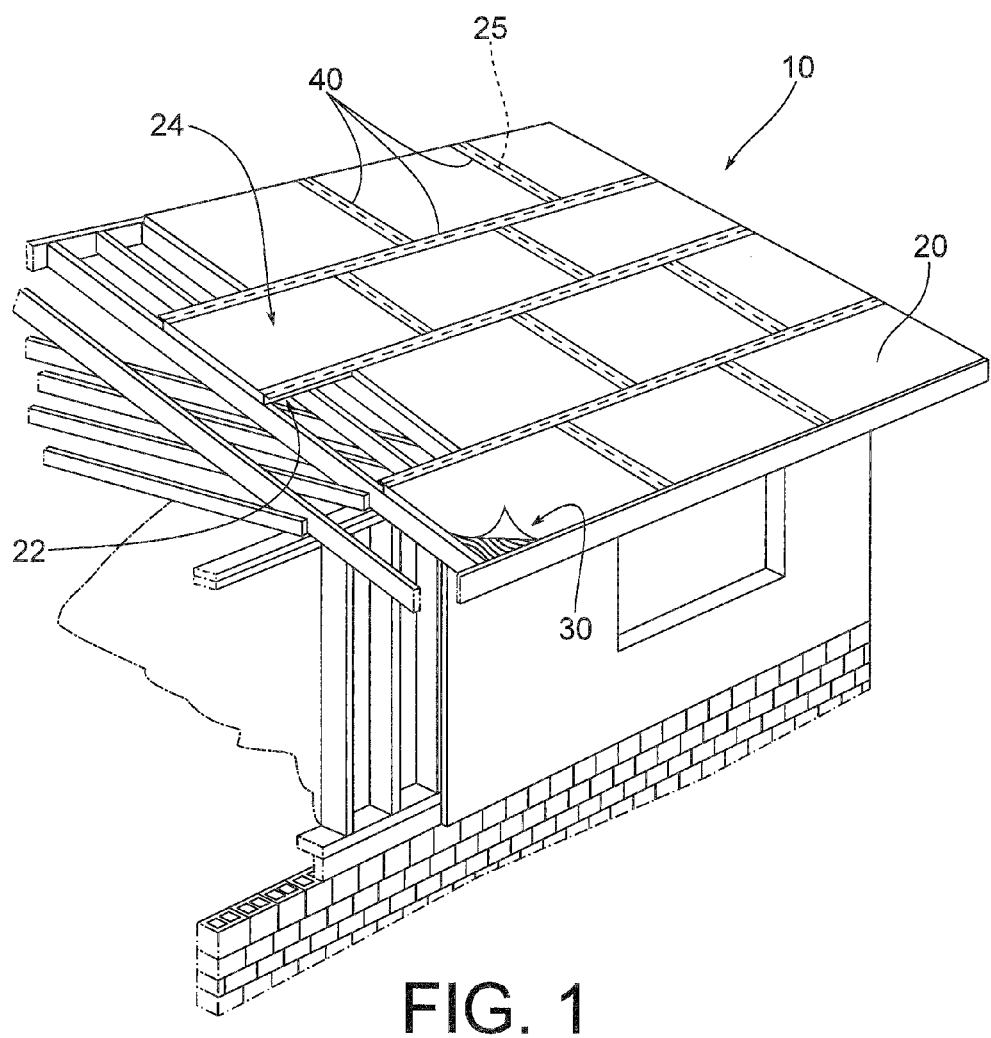
FIG. 1 is a perspective view of a panelized roofing system utilizing the panel of the present invention.

FIG. 1 illustrates a panelized roof sheathing construction system 10 for a building having a plurality of panels 20 attached to a building frame structure in substantially abutting relationship. The panels 20 have an inward facing surface 22, an outward facing surface 24 and at least one peripheral edge. The system 10 also includes a plurality of water resistant barrier layers 30 adhesively secured to at least one of the surfaces 22, 24 of the panels 20, each barrier layer 30 providing a substantially skid-resistant and bulk water resistant surface. One example of a paper overlaid wood board is shown and described in U.S. Pat. No. 6,737,155 entitled "Paper Overlaid Wood Board and Method of Making the Same" which is incorporated herein by reference. Additionally, the system 10 preferably includes a plurality of water-resistant sealing means 40, each of the means 40 sealing at least one of the joints 25 between the adjacent panels 20.

Figure 2:
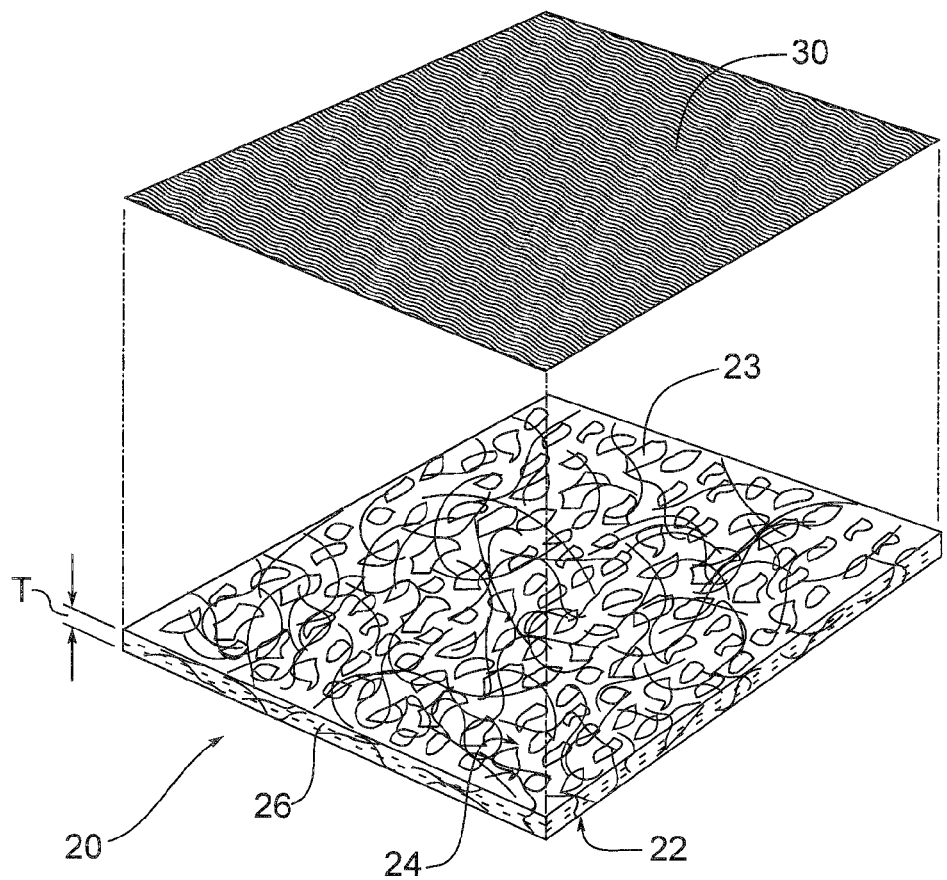
FIG. 2 is an exploded perspective view of a first embodiment of one panel of the present invention.

The panels 20 prepared according to the present invention may be made from a variety of different materials, such as wood or wood composite materials. As shown in FIG. 2, the panels 20 are preferably comprised of an oriented strand board substrate ("OSB") having at least two surfaces 22, 24 with at least one core layer 26 disposed between them. OSB panels are derived from a starting material that is naturally occurring hard or soft woods, singularly or mixed, whether such wood is dry (preferably having a moisture content of between 2 wt % and 12 wt %) or green (preferably having a moisture content of between 30 wt % and 200 wt %) or of moisture content in between dry and green (preferably having a moisture content of between 12 wt % and 30 wt %). Typically, the raw wood starting materials, either virgin or reclaimed, are cut into veneers, strands, wafers, flakes, or particles of desired size and shape, which are well known to one of ordinary skill in the art.

Each of the surface layers 22, 24 of the panel 20 are preferably oriented in parallel with the long dimension of the panel 20, and the oriented strand board core 26 preferably includes a plurality of substantially parallel strands 23 that are oriented perpendicular to the strands of the surface layers 22, 24. The panels 20 of the panelized roof system 10 may be selected from a number of suitable materials that provide adequate protection against the penetration of bulk water. Preferably, the panels of the present invention are comprised of reconstituted lignocellulosic furnish. More preferably, the panels 20 are comprised of structural wood such as OSB or plywood. Types of wood material used to manufacture the panels 20 may be, but are not limited to particle board, medium density fiber board, waferboard or the like.

The presently described panels 20 are preferably of a thickness T in a range from about 0.635 cm (0.25 inches) to about 3.175 cm (1.25 inches). The panels 20 may also comprise a radiant barrier material attached to the lower face of the panel, i.e., the face of the panel facing inwardly, toward the interior of the building. The radiant barrier material preferably includes a reflective surface that reflects infrared radiation that penetrates through the roof back into the atmosphere. The combination of this reflective function, as well as the foil's low emissivity, limits the heat transfer to the attic space formed in the interior of the building in the space under the roof. By limiting the heat transfer, the attic space temperature is reduced, which in turn reduces the cost of cooling the house.

The radiant barrier material may simply be a single layer radiant barrier sheet, such as metal foil, such as aluminum foil. Alternatively, the radiant barrier material may be composed of a radiant barrier sheet adhered to a reinforcing backing layer made from a suitable backing material, such as polymeric film, corrugated paper board, fiber board or kraft paper. The backing material makes the foil material easier and more convenient to handle. The multi-layered material may be a laminate in which a backing material is laminated to a radiant barrier sheet.

Methods of manufacturing the radiant barrier material are discussed in greater detail in U.S. Pat. No. 5,231,814, issued Aug. 3, 1993 to Hageman and U.S. Pat. No. 3,041,219, issued Jun. 26, 1962, to Steck et al. Other suitable radiant barrier material is manufactured under the name SUPER R™ by Innovative Insulation, Inc. of Arlington, Tex. These SUPER R™ products have two layers of aluminum foil each of which have an aluminum purity of 99%, and a reinforcing member located inside, between the two layers. The reinforcing member may be a reinforcing scrim or a polymer fabric.

Both the radiant barrier material and the barrier layer can be applied to the panel by spreading a coat of adhesive to the surface of the panel, applying the heat-reflecting material (or the barrier layer) over the adhesive onto the panel and pressing the radiant barrier material (or barrier layer) onto the panel. After the adhesive dries or cures, the panel is ready for use.

Additionally, the radiant barrier may be a coating on either side of the panel 20, which could be used facing into or out from the attic. Additionally, some panels 20 may also provide protection against ultraviolet light per ASTM G53, G154, which does not delaminate, does not reduce slip resistance, and does not promote fading.

Figure 3:
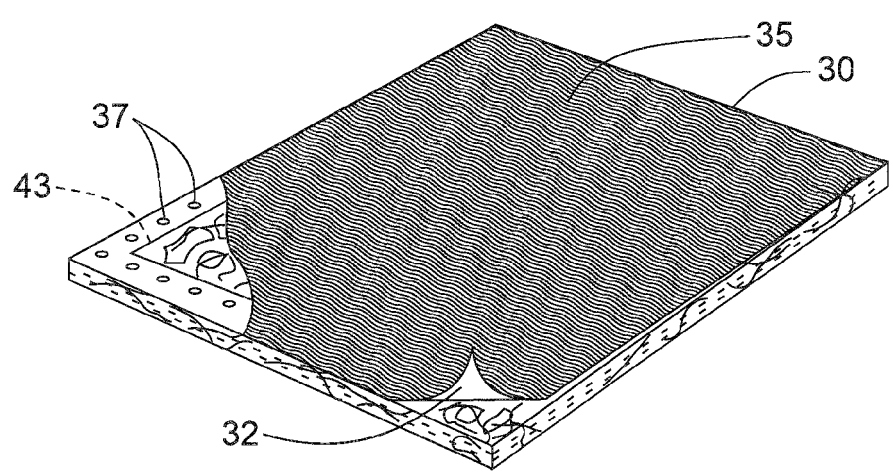
FIG. 3 is a view of a panel and barrier layer according to the present invention.

Referring now to FIG. 3, the panel for the panelized roof or wall system 10 includes a barrier layer 30 secured to the outward facing surface of panel 20, with each barrier layer 30 providing a substantially skid-resistant surface 35.

These barrier layers 30 may optionally be comprised of a resin-impregnated paper 32 having a paper basis weight of 21.772 kg (48 lbs.) to about 102.058 kg (225 lbs.) per ream or a dry weight of about 78.16 gm/m$^2$ (16 lbs./msf) to about 366.75 gm/m$^2$ (75 lbs./msf), and they preferably substantially cover the outward facing surface 24 of the panels 20. The paper 32 is preferably resin-impregnated with a resin such as, but not limited to a phenol-formaldehyde resin, a modified phenol-formaldehyde resin, or other suitable resin. Preferably, the paper has a resin content of about greater than 0% to about 80% by dry weight, most preferably from a range of about 20% to about 70% by dry weight. The resin-impregnated paper for the panel in the panelized roof or wall sheathing construction system of the present invention also preferably includes a glueline layer 50 in a range from about 9.77 gm/m$^2$ (2 lbs./msf) to about 244.5 gm/m$^2$ (50 lbs./msf), and more preferably of a range from about 9.77 gm/m$^2$ (2 lbs./msf) to about 177.24 gm/m$^2$ (12 lbs./msf). The glueline layer 50 may be formed from a phenol-formaldehyde resin, and isocyanate, or the like.

Further optionally, the barrier layer may comprise an applied coating layer. One such coating is an experimental acrylic emulsion coating from Akzo-Nobel. Another suitable coating is Valspar's Black Board Coating. It is understood that by those skilled in the art that other classes of coatings may serve as an appropriate barrier layer. Coatings may be used with paper overlays to add the desired functions to the panel.

The barrier layer 30 is resistant to bulk water but permeable to water vapor. These panels with barrier layers 30 are optionally characterized by water vapor permeance in a range from about 0.1 U.S. perms to about 1.0 U.S. perms, and have a water vapor transmission rate from about 0.7 to about 7 g/m$^2$/24 hrs (at 73° F.—50% RH via ASTM E96 procedure A), and have a water vapor permeance from about 0.1 to about 12 U.S. perms (at 73° F.—50% RH via ASTM E96 procedure B), and a liquid water transmission rate from about 1 to about 28 (grams/100 in$^2$/24 hrs via Cobb ring), per ASTM D5795. This test method allows the quantification of liquid water that passes through the underlayment to the underlying substrate and can be easily done on specimens where the underlayment cannot be removed for visual inspection.

An embodiment of this invention suggests that a non-skid surface that has a coefficient of friction equal to or better than plywood or oriented strand board when dry and/or wet can be achieved in a primary process that is both quick and relatively inexpensive. Specifically, the water-resistant barrier layers 30 of the present invention advantageously provide a textured surface 35 to the structural panels 20. Specifically, the textured surface 35 is adapted to provide a wet coefficient of friction in a range of from about 0.8 to about 1.1 (English XL Tribometer) and a dry coefficient of friction in a range of from about 0.8 to about 1.1 (English XL Tribometer). Examples of methodology used to measure wet surfaces may be found at pg. 173 in "Pedestrian Slip Resistance; How to Measure It and How to Improve It." (ISBN 0-9653462-3-4, Second Edition by William English).

Figure 4:
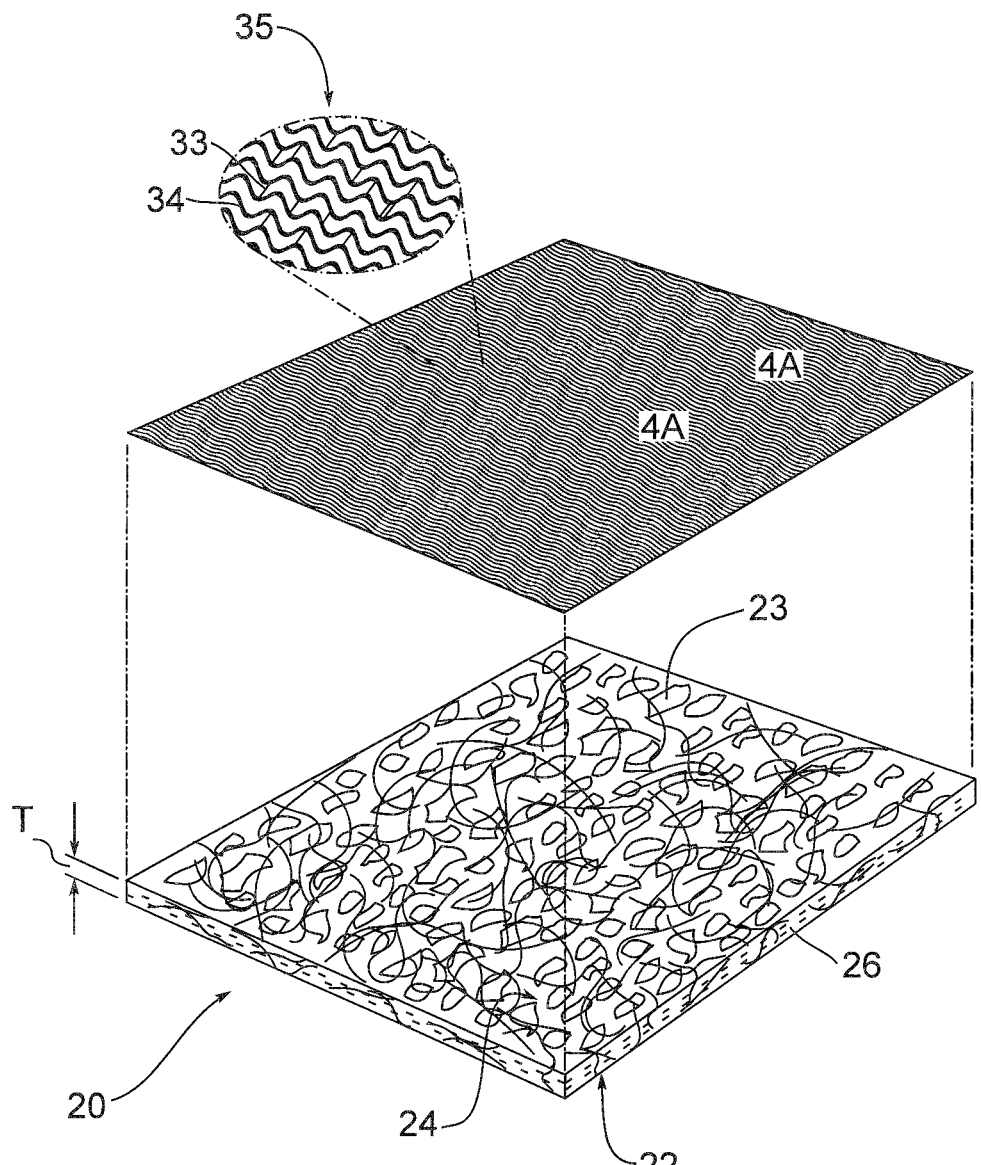
FIG. 4 is an exploded perspective view of a panel, showing a detailed exploded view of the textured surface, according to the present invention.
Figure 4A:
FIG. 4A is a cross-sectional view of the textured surface taken along the line 4A-4A of FIG. 4.

Referring now to FIG. 4A, the textured surface 35 is characterized by an embossed pattern of features or indentations. As used herein, "embossing" can mean embossing, debossing, scoring, or any other means to alter the texture of the panel other than adding grit or the like to the surface.

The texture preferably has a number of features or elements disposed in a first direction and a number of features or elements disposed in a second direction. For example, a first group of elements may be disposed in a direction across the width of a panel and a second group of elements may be disposed in a direction along the length of a panel. These elements or features disposed in first and second directions may be of similar or may be of different sizes. The elements similarly may be of different or of similar shapes. Non-limiting examples of similarly sized features include a embossed herringbone or a embossed basketweave configuration. A herringbone pattern may be very tightly disposed or may be somewhat "spread-out" in such a manner so that major channels with minor indentations are created.

The embossed textured surface preferably is more preferably comprised of a plurality of major or primary textured features and a plurality of minor or secondary textured features. Preferably, the minor or secondary textured features are at least partially disposed on one or more corresponding major feature. To illustrate, and although the general appearance of the preferred textured surface 35 appears to be a random pattern of raised areas, a closer examination of the preferred textured surface reveals finer detail. Specifically, the preferred textured surface 35 includes a plurality of major channels 33 that are disposed substantially parallel with a pair of opposing edges (preferably the shorter pair of opposing edges) of the panel. Additionally, a plurality of minor indentations 34 are disposed within the major channels 33 and run generally orthogonally to the major channels. It should be appreciated that the exploded magnified view of FIG. 4, showing the minor indentations 34 and major channels 33 in detail, is illustrative and does not necessarily represent the preferred density of minor indentations or major channels.

Although it is within the scope of the present invention to provide for advantageous slip-resistance by providing any number of major channels, preferably, the density of the major channels is about 5 to about 15 major channels per 2.54 cm (inch) as measured in a direction perpendicular to the direction of the major channels. More preferably, the density of the major channels is about 9 to about 12 major channels per 2.54 cm (inch) as measured in a direction perpendicular to the direction of the major channels. On a typical 1.219 m×2.438 m (4'×8') sheathing panel, the major channels will preferably run generally across the 1.219 m (four-foot) or short direction. It should be appreciated that it is not necessary nor required that the major channels be exactly parallel and may undulate slightly from side to side in a somewhat serpentine fashion rather than being straight.

Although it is within the scope of the present invention that the minor indentations 34 may vary in length and width, the minor indentations 34 have a preferably elongated shape that measures preferably about 0.0508 cm (0.020 inches) to about 0.254 cm (0.100 inches) in length and about 0.0254 cm (0.010 inches) to about 0.254 cm (0.100 inches) wide. Although it is within the scope of the present invention to provide for advantageous slip-resistance by providing any number of minor indentations, preferably, the density of the minor indentations is about 15 to about 35 of the minor indentations per inch as measured along the direction of the major channels. The long direction of the minor indentations preferably extends generally across the eight-foot (or long) direction of a typical panel.

The textured surface may also, alternatively, be created via a plurality of raised protrusions and grooves. The protrusions may have a height in a range of about 0 mils to about 25 mils, preferably from a range of about 3.0 to about 13.0 mils as measured by profilometry (Mitutoyo SJ201P).

In accordance with the preferred configuration of the textured surface 35, in a typical roof sheathing application using 1.219 m×2.438 m (4'×8') panels where the 2.438 m (eight-foot) edge of the sheathing panel is parallel to the floor of the home, the major channels 33 will generally be oriented up and down, while the long direction of the minor indentations 34 will generally run across the roof. Preferred depth of the major channels and minor indentations have been found to be in a range of about 5 to about 13 mils as measured by the Mitutoyo Surface Profiler. It should be appreciated that at least some of the major channels and minor indentations may be of a depth greater or deeper than the thickness of the paper (i.e., some of the major channels and minor indentations may be of a depth that would project into the surface of the panel).

The anti-skid surface of the present system advantageously reduces the potential for a ladder leaning thereon to slip. A worker who is applying house wrap or taping house wrap is currently exposed to the risk of his ladder skidding against the slippery surface of house wrap. Current house wrap products create the opportunity for a worker to fall from a ladder that skids against house wrap. The surface of current house wrap products promotes the likelihood of "ladder slip." Workers have complained that ladders will slide unless they apply a skid resistant product to their ladders As shown in FIG. 3, the barrier layers 30 may further include indicia 37 for positioning fasteners. U.S. Pat. App. Pub. 2003/0079431 A1 entitled "Boards Comprising an Array of Marks to Facilitate Attachment", incorporated herein by reference, provides additional detail regarding fastener indicia 37. Additionally, the barrier layers are preferably adapted to receive fasteners in a substantially moisture-proof manner.

Figure 5:
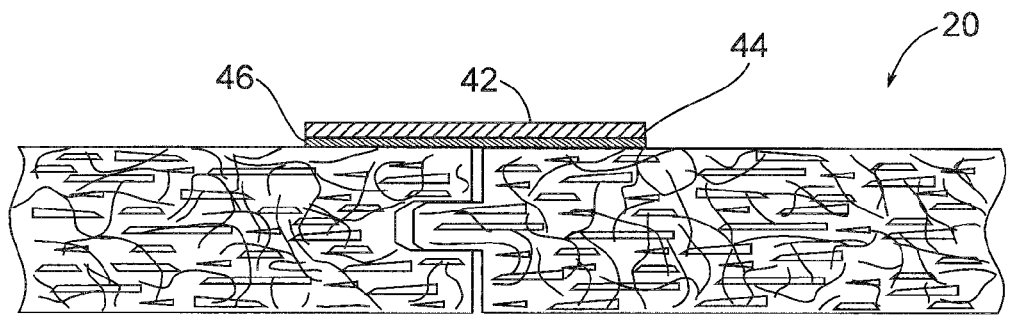
FIG. 5 is a partial cross-sectional view of two adjacent panels according to one embodiment of the present invention.

FIG. 5 illustrates the cross-sectional profile of a further aspect of the panel for a panelized roof or wall sheathing construction system 10. When attached to a building frame, joints 25 form between the panels 20. Particularly, shown is a water-resistant sealing means comprised of strips of water-resistant tape 42 with backing 44 and an adhesive layer 46. Each of the strips of tape 42 may be applied by a hand held tape applicator to at least one joint between adjacent panels 20 to form a substantially moisture-resistant seam with roofing accessory materials such as skylights, ventilation ducts, pipe boots, felt, flashing metals, roofing tapes, and various building substrates. The tape 42 of the present invention may have no backing or a backing 44 with a thickness of about ½ to about 1/30 the thickness of the adhesive layer 46. Optionally, the strips of tape 42 may have a backing of a thickness of about 1.0 mils to about 4.0 mils and an adhesive layer disposed on the backing of a thickness of about 2.0 mils to about 30.0 mils. The dry coefficient of friction for the tape is preferably of at least about 0.6. As shown in FIG. 3, alignment guides 43 on the panel for applying the tape strips 42 are also contemplated to facilitate installation. Preferably, the alignment guides 43 are placed approximately a distance of about ½ the width of the tape from the panel edge. The tape strips 42 are preferably installed by means of a handheld tape applicator.

The panels 20 of the panelized roof sheathing construction system 10 preferably have a first edge which is parallel with a corresponding second edge of a panel 20 and are preferably linked together via one of a tongue 27 and groove 28 configuration (FIG. 5), an H-clip configuration, or a mating square edge configuration, as would be understood by one skilled in the art.

Figure 6:
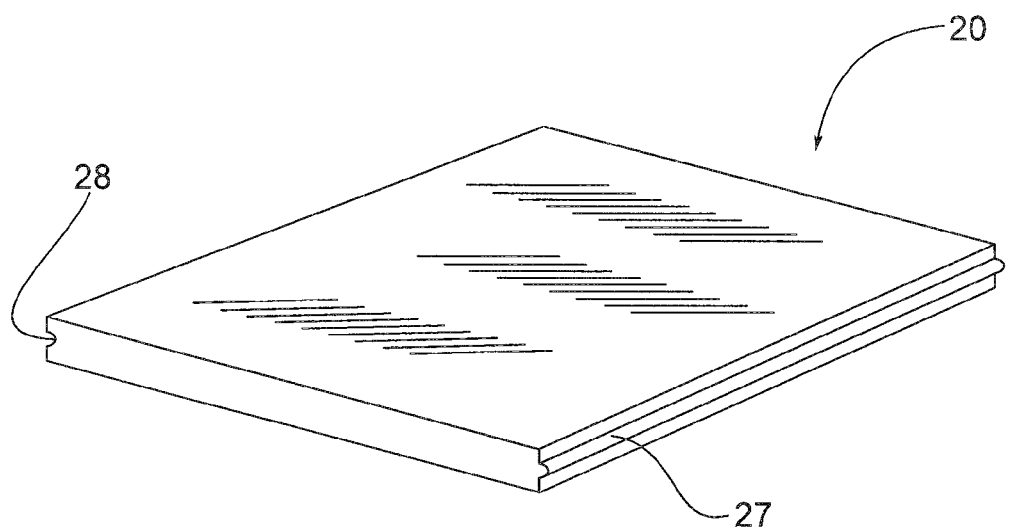
FIG. 6 is a perspective view of a panel according to an embodiment of the present invention.

Referring now to FIG. 6, each of the first and second edges preferably have contiguous sections of equal length, with each section potentially including a groove 28 and a tongue 27 compatible with a corresponding groove 28 (and tongue 27). An example of one such tongue and groove panel is shown and described in U.S. Pat. No. 6,772,569 entitled "Tongue and Groove Panel" which is incorporated herein by reference.

Another such example is shown and described in U.S. patent application Ser. No. 10/308,649 entitled "Composite Wood Board having an Alternating Tongue and Groove Arrangement along a Pair of Edges" which is incorporated herein by reference. The length of the first edge of each panel 20 is preferably a multiple of the length of a section, with the multiple being at least two. The length of the tongue 27 in each section measured in the longitudinal direction of an edge is preferably less than or equal to the length of the grooves 28, or the longest groove 28 in each section.

Figure 11:
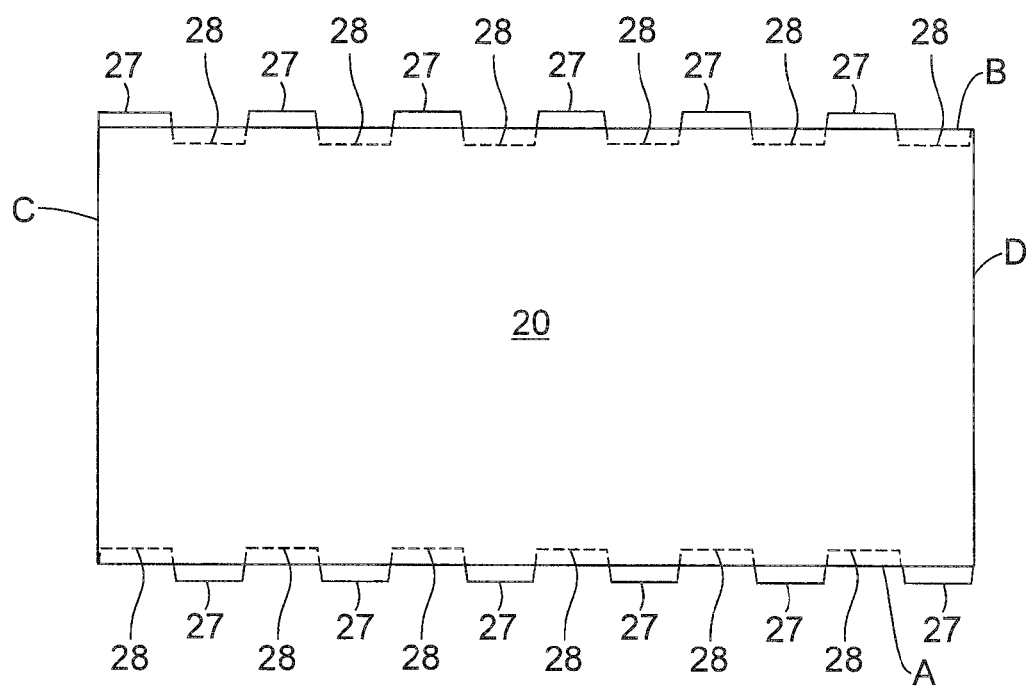
FIG. 11 is a plan view of a panel, according to the invention.

Referring to FIG. 11, panel 20 may have a first edge A, a second edge B, a third edge C and a fourth edge D. Edges A and B may be parallel. Edges C and D may be parallel and substantially perpendicular to edges A and B. Each of the edges A and B of panel 20 may include an alternating tongue and groove arrangement. Specifically, edge A includes perpendicularly extending tongues 27 and grooves 28. Edge B is similarly constructed. It includes tongues 27 and grooves 28. Edge C is in contact with tongue 27 of edge B and groove 28 of edge A. Edge D is in contact with groove 28 of edge B and tongue 27 of edge A. Thus, the tongues and grooves of panel 20 are directly opposite each other.

Figure 12A:
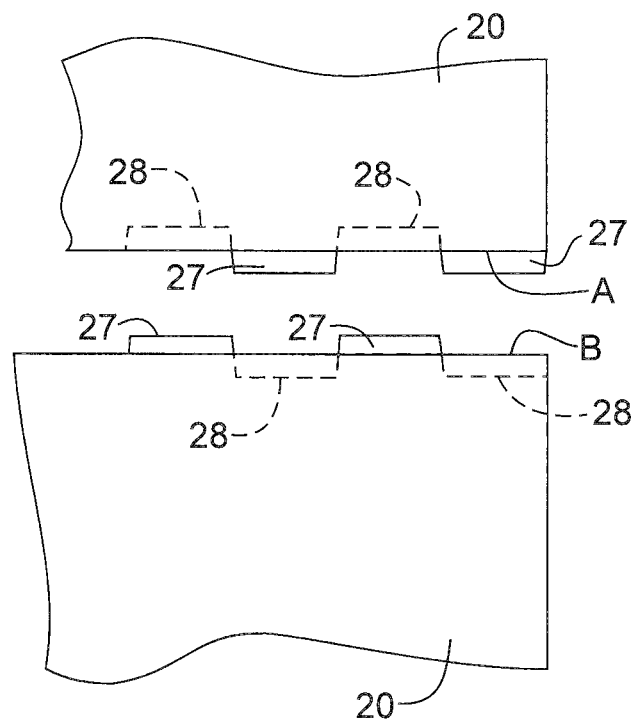
FIG. 12A is a partial plan view of a pair of panels; each according to the invention, aligned for engagement.
Figure 12B:
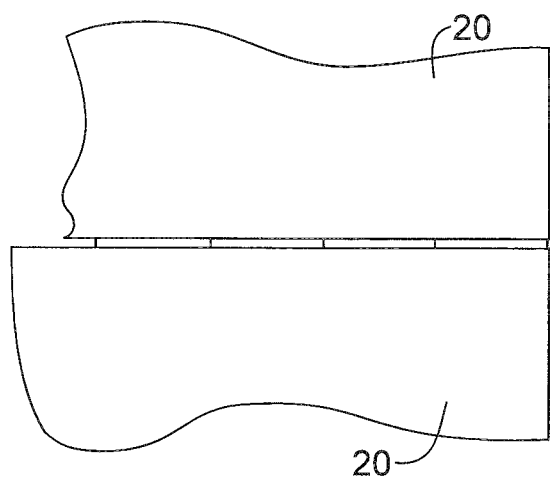
FIG. 12B is a partial plan view of a pair of panels, each according to the invention, engaged.

Referring to FIGS. 12A and 12B, the tongues 27 and grooves 28 along edge A of panel 20 can be brought into engagement with the grooves 28 and tongues 27 of edge B of adjacent panel 20. Similarly, if one of the boards 20 is rotated one hundred and eighty degrees, the tongues 27 and grooves 28 along abutting edges can be brought into engagement.

Figure 10:
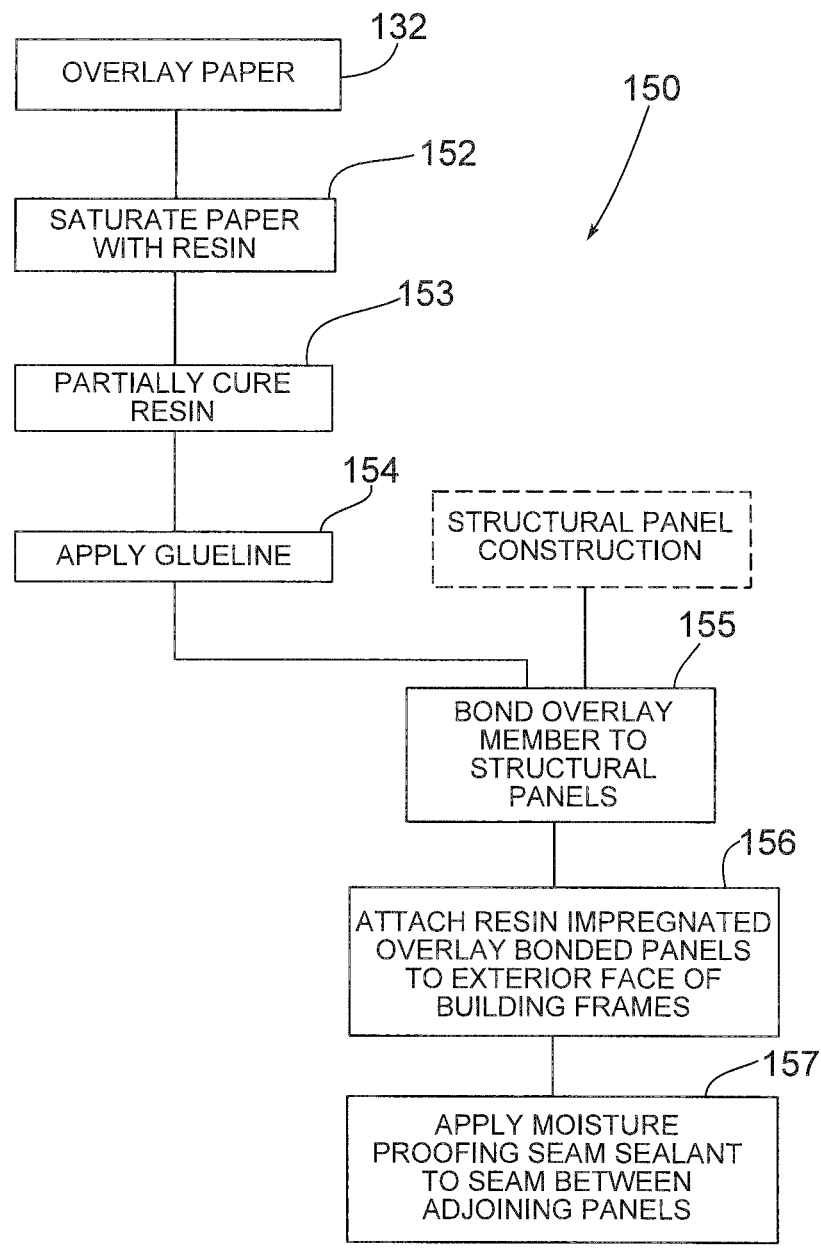
FIG. 10 is a flow diagram of the steps included in the manufacture of a panel for roof or wall sheathing system according to the present invention.

As a general summary shown in FIG. 10, producing skid-resistant and water-resistant building panels of the present invention comprises the steps of providing a roll of dry paper, feeding a leading edge of a sheet of paper from said roll of dry paper onto a forming belt, and depositing reconstituted lignocellulosic furnish with an applied binding agent atop the dry paper sheet so as to form a lignocellulosic mat having first and second lateral edges. The flake mat and the dry paper sheet are cut into a segment of a predetermined length. Preferably, the top surface of the flake mat is compressed and the first and second lateral edges of the flake mat are packed prior to the cutting step. The segments are transferred onto a loading screen and then into a hot press. Sufficient heat and pressure are provided in order to set the panel structure and to form a skid-resistant surface resulting from the screen imprint on said paper. The segments are cut into panels of predetermined sizes. The paper sheet is preferably wet prior to transferring the segment onto the loading screen. Additionally, indicia 37 for positioning fasteners or tape alignment guides 43 are preferably marked onto the panel.

As a person becomes accustomed to walking on sloped surfaces such as roof systems, a small change in the coefficient of friction can cause someone to easily lose his or her footing. This is illustrated in Table 1, which shows the coefficient of friction of plywood, OSB, those panels with securely fastened roofing felt and OSB and plywood with loose felt paper applied. The significant differences seen in the coefficient of friction of systems between felt paper being securely fastened and loose, is more than enough to cause a slipping hazard. The present system 10 has an advantage over felt paper in that the coefficient of friction does not change since the barrier layer 30 is securely fastened to the panel 20 prior to installation thus virtually eliminating the occurrence of paper coming loose in the field.

It is important that the panels used in roof applications are not slippery in service. It has also been observed that the coefficient of friction can vary among roof sheathing products of similar types from different sources. Further, the coefficient of friction of panels from one manufacturer can change dramatically, such as when the panels get wet from a change in weather conditions or morning dew. Further, the change in coefficient of friction can be inconsistent among manufacturers. This may be the result of process conditions, wood species, and raw materials used to manufacture these products. Sanding does not improve friction for sheathing panels even though it removes a top layer of wood that may be partially degraded by the process conditions, but it does promote adhesion for secondary lamination. Flat laminated products are perceived to be more slippery than textured products, and water on many substrates makes them slippery when wet. An anti-skid coating can be added to improve the coefficient of friction, but these coatings add additional manufacturing steps, equipment, and cost. Indeed, when plywood or OSB panels are overlaid with paper to create a smooth surface, the coefficient of friction drops compared to regular plywood and OSB. Adding texture to the surface of OSB has been suggested as a method of improving friction or skid-resistance of these panels, but testing of OSB sheathing using the English XL Tribometer showed that the coefficient of friction of the smooth and textured sides of OSB were very similar under dry conditions and that the texture could decrease the coefficient of friction in the wet condition, which is shown in Table 2.

Thus, another notable advantage of the present invention is retained skid resistance when wet. When texture is added to the surface of an overlaid wood composite panel of the present invention, the coefficient of friction unexpectedly increased above that of standard plywood and OSB.

An embodiment of the present invention is illustrated in Tables 3 & 4 and Plots 2 & 3, which shows the coefficient of friction of the screen imprinted overlaid panel vs. smooth overlaid panels, oriented strand board with a screen imprint, oriented strand board that has been sanded and plywood in dry and wet conditions. Paper basis weights (per ream) of 31.751 kg (70 lbs.), 44.906 kg (99 lbs.) and 59.874 kg (132 lbs.) were also tested and compared to show that the range of paperweights mentioned in the embodiment of this record of invention will satisfy the coefficient of friction requirements.

From testing conducted using the English XL Tribometer, the coefficient of friction, as can be seen from Table 3, is significantly higher when a screen imprint is embossed on the surface of the panels as compared to the smooth surface of paper-overlaid panels. From Table 4, it can be seen that the coefficient of friction of the overlaid panels with the textured surface does not significantly decrease when wet and is much better than the coefficient of friction of plywood when wet.

As one example of this invention, a roll of Kraft paper of 44.9 kg (99 lb.) basis weight (per ream), saturated to about 28% by weight resin content with a glue line of phenolic glue of about 4.536 kg/304.8 m² (10-lbs/1000 ft²) applied to one side of the paper was mounted onto a paper feeding apparatus so that the paper could be fed onto the forming line of an oriented strand board.

The paper was then fed onto the forming line belt with the glue line side of the paper facing up away from the belt. To prevent wrinkling or tearing of the paper, the paper roll must be un-wound at a speed that is consistent with the speed of the forming line. To maintain complete coverage of the paper overlay onto the wood composite substrate, the paper is aligned with the forming line belt as it carries the mat toward the press.

Once the paper is fed onto the forming line, a wood mat is formed on top of the paper as it moves toward the press. The wood mat is formed with the first and second layers being the surface layers composed of strands oriented in a direction parallel to the long dimension of the panels and a third core layer composed of strands oriented in a direction perpendicular to the first and second layers.

TABLE 1

ANOVA table showing the differences in the coefficient of friction between common roofing panels of plywood and OSB and the use of felt that is securely fastened or loose on these panels. The coefficient of friction of the panel of a preferred embodiment is also shown for reference.

Analysis of Variance for CoF

| Source | DF | SS | MS | F | P |
|---|---|---|---|---|---|
| Product | 5 | 2.47230 | 0.49446 | 151.42 | 0.000 |
| Error | 66 | 0.21552 | 0.00327 | | |
| Total | 71 | 2.68782 | | | |

TABLE 1-continued

ANOVA table showing the differences in the coefficient of friction between common roofing panels of plywood and OSB and the use of felt that is securely fastened or loose on these panels. The coefficient of friction of the panel of a preferred embodiment is also shown for reference.

| Level | N | Mean | StDev | Individual 95% CIs For Mean Based on Pooled StDev |
|---|---|---|---|---|
| Embodiment 1 | 12 | 0.9043 | 0.0516 | (-*-) |
| Felt | 12 | 0.9973 | 0.0233 | (-*--) |
| Loose felt[1] | 12 | 0.5136 | 0.0323 | (-*-) |
| Loose felt[2] | 12 | 0.5646 | 0.0432 | (--*-) |
| OSB | 12 | 0.7381 | 0.0771 | (-*-) |
| plywood | 12 | 0.9360 | 0.0868 | (-*--) |
| | | | | 0.60  0.75  0.90 |

Pooled StDev = 0.0571
[1]Loose felt over OSB substrate.
[2]Loose felt over plywood substrate.

Figure 13:
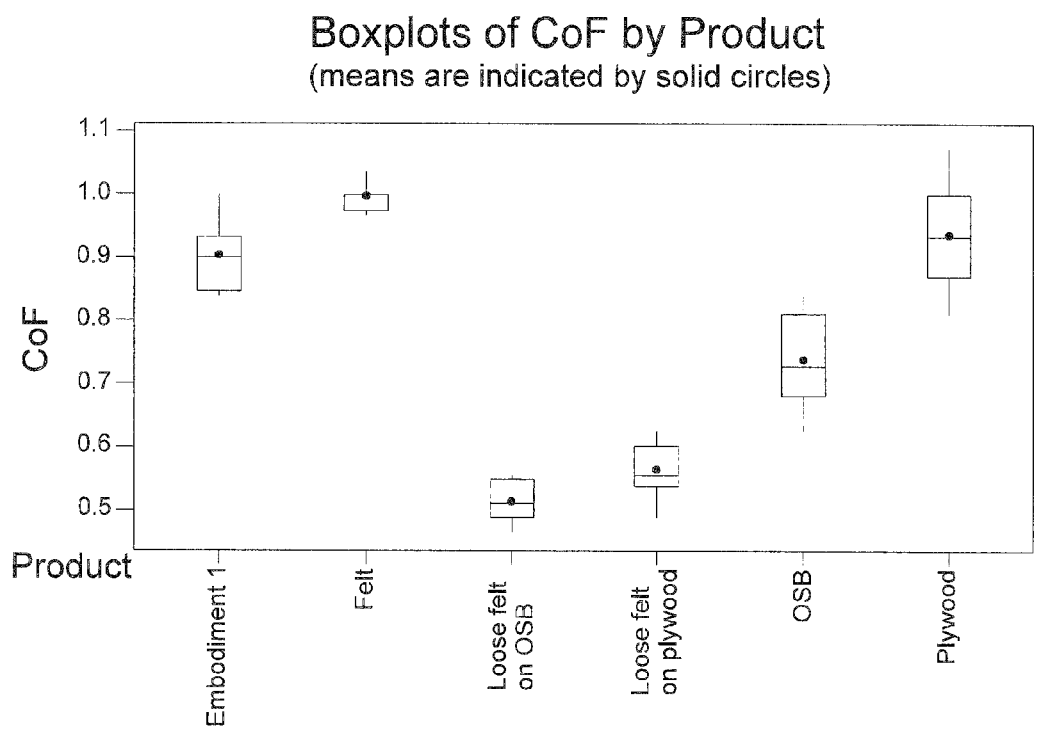
FIG. 13 is a diagram of box plots showing the differences in the coefficient of friction between paper overlaid wood composite panels with smooth and textured surfaces, oriented strand board with a textured surface, oriented strand board with a sanded surface and plywood in the dry condition.

FIG. 13 illustrates box plots showing the differences in the coefficient of friction between paper overlaid wood composite panels with smooth and textured surfaces, oriented strand board with a textured surface, oriented strand board with a sanded surface and plywood in the dry condition. "Level" is expressed as paper basis weight per ream for overlay panels. CoF=Coefficient of friction.

TABLE 2

ANOVA table showing the differences in the slip angle between the textured and smooth sides of OSB in the dry and wet condition and plywood in the wet and dry condition. The coefficient of friction is related to slip angle by CoF = Tan (slip angle), where the slip angle is expressed in radians.

| Source | DF | SS | MS | F | P |
|---|---|---|---|---|---|
| Factor | 5 | 232.33 | 46.47 | 12.46 | 0.000 |
| Error | 90 | 335.63 | 3.73 | | |
| Total | 95 | 567.96 | | | |

| Level | N | Mean | StDev | Individual 95% CIs For Mean Based on Pooled StDev |
|---|---|---|---|---|
| dry-plywood | 16 | 42.000 | 0.177 | (----*----) |
| dry-Textured | 16 | 41.500 | 0.530 | (----*---) |
| dry-Smooth | 16 | 42.063 | 0.442 | (---*----) |
| wet-plywood | 16 | 40.000 | 1.237 | (----*----) |
| wet-Textured | 16 | 37.625 | 0.530 | (----*----) |
| wet-Smooth | 16 | 39.938 | 1.326 | (----*---) |
| | | | | 38.0  40.0  42.0 |

Pooled StDev = 0.824

TABLE 3

ANOVA table showing the differences in the coefficient of friction between paper overlaid panels with a smooth surface and with a textured imprint as well as oriented strand board with a textured imprint, oriented strand board sanded and plywood in the dry condition. "Level" is expressed as paper basis weight (in lbs.) per ream for overlay panels.

Analysis of Variance for CoF Dry

| Source | DF | SS | MS | F | P |
|---|---|---|---|---|---|
| Product | 8 | 0.90809 | 0.11351 | 16.4 | 0.000 |
| Error | 177 | 1.22522 | 0.00692 | | |
| Total | 185 | 2.13331 | | | |

Individual 95% CIs For Mean Based on Pooled StDev

| Level | | N | Mean | StDev | |
|---|---|---|---|---|---|
| 132 lbs. | Paper Smooth | 23 | 0.9125 | 0.1045 | (---*---) |
| 132 lbs. | Paper Textured | 20 | 1.0614 | 0.0269 | (----*---) |
| 70 lbs. | Paper Textured | 20 | 0.9882 | 0.0422 | (----*---) |
| 70 lbs. | Paper Smooth | 20 | 0.9106 | 0.1148 | (----*---) |
| 99 lbs. | Paper Textured | 20 | 1.0533 | 0.0319 | (----*---) |
| 99 lbs. | Paper Smooth | 24 | 0.9343 | 0.1079 | (---*---) |
| | OSB Sanded | 26 | 0.8391 | 0.1103 | (---*---) |
| | OSB Textured | 17 | 0.9801 | 0.0428 | (----*---) |
| | Plywood | 16 | 0.9864 | 0.0666 | (----*----) |

0.880   0.960   1.040

Pooled StDev = 0.0832

Figure 14:
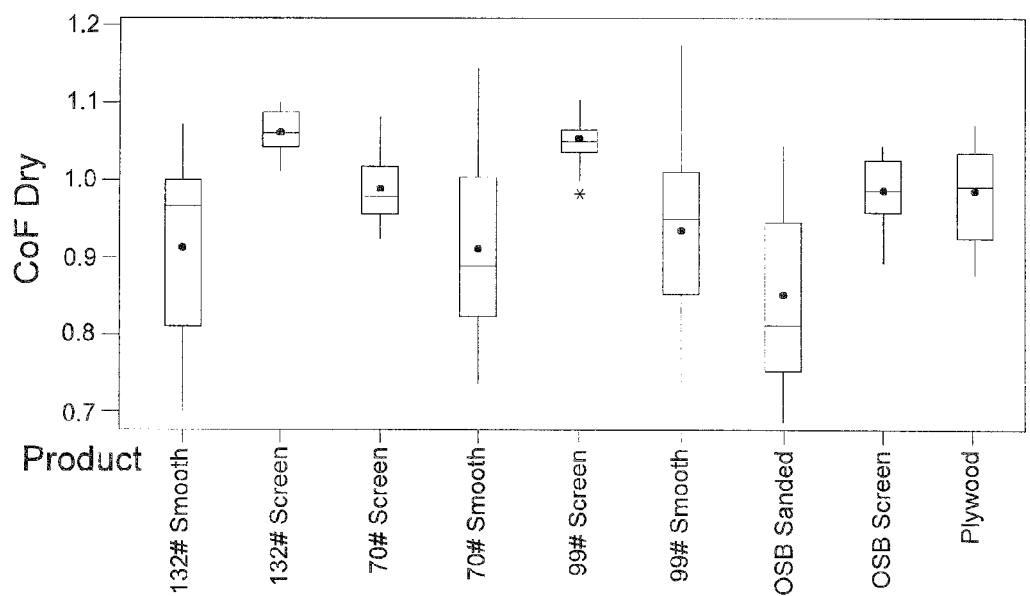
FIG. 14 is a diagram of box plots showing the differences in the coefficient of friction between paper overlaid wood composite panels with smooth and textured surfaces, oriented strand board with a textured surface, oriented strand board with a sanded surface and plywood in the dry condition.

FIG. 14 illustrates box plots showing the differences in the coefficient of friction between paper overlaid wood composite panels with smooth and textured surfaces, oriented strand board with a textured surface, oriented strand board with a sanded surface and plywood in the dry condition. "Level" is expressed as paper basis weight per ream for overlay panels. CoF=Coefficient of friction.

TABLE 4

ANOVA table showing the differences in the coefficient of friction between paper overlaid wood composite panels with smooth and textured surfaces and plywood in the wet condition. "Level" is expressed as paper basis weight per ream for overlay panels. CoF = Coefficient of friction.

Analysis of Variance for CoF Wet

| Source | DF | SS | MS | F | P |
|---|---|---|---|---|---|
| Product | 6 | 1.59735 | 0.26623 | 207.03 | 0.000 |
| Error | 136 | 0.17489 | 0.00129 | | |
| Total | 142 | 1.77224 | | | |

Individual 95% CIs For Mean Based on Pooled StDev

| Level | | N | Mean | StDev | |
|---|---|---|---|---|---|
| 132 lbs. | Paper Smooth | 23 | 0.8180 | 0.0373 | (-*-) |
| 132 lbs. | Paper Textured | 20 | 1.0410 | 0.0294 | (-*-) |
| 70 lbs. | Paper Textured | 20 | 1.0125 | 0.0286 | (-*-) |
| 70 lbs. | Paper Smooth | 20 | 0.8003 | 0.0426 | (-*-) |
| 99 lbs. | Paper Textured | 20 | 1.0386 | 0.0284 | (-*-) |
| 99 lbs. | Paper Smooth | 24 | 0.8039 | 0.0432 | (*-) |
| | Plywood | 16 | 0.8882 | 0.0362 | (-*-) |

0.800   0.880   0.960   1.040

Pooled StDev = 0.0359

Figure 15:
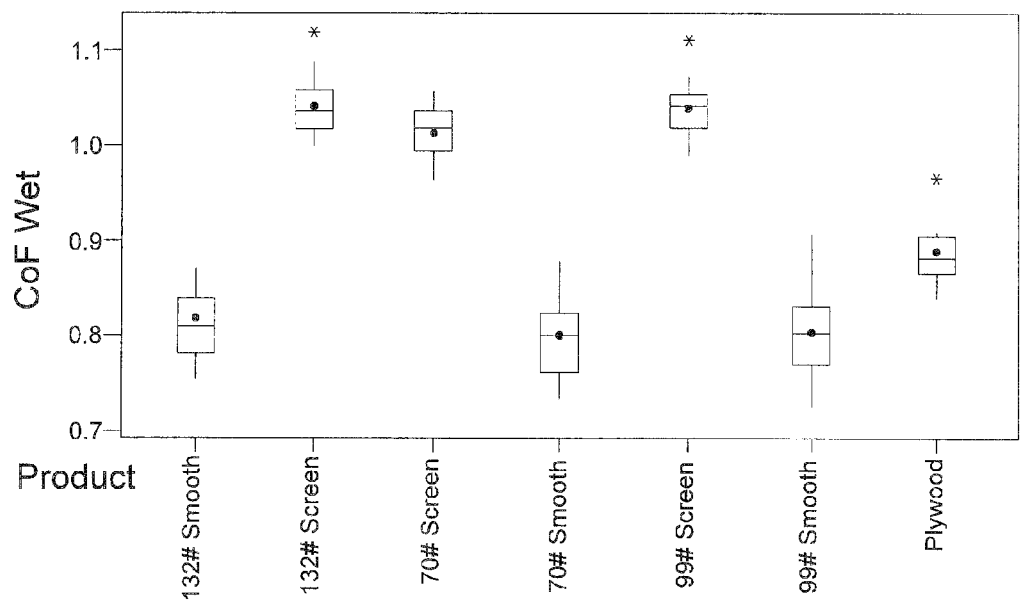
FIG. 15 is a diagram of box plots showing the differences in the coefficient of friction between paper overlaid wood composite panels with a smooth and textured surface and plywood in the wet condition.

FIG. 15 illustrates box plots showing the differences in the coefficient of friction between paper overlaid wood composite panels with a smooth and textured surface and plywood in the wet condition. "Level" is expressed as paper basis weight per ream for overlay panels. CoF=Coefficient of friction.

During this process, flakes can be pushed underneath the paper overlay and can be pressed on to the surface of the panel, giving the panel a low quality look and hindering the performance of the final product. Therefore, air wands are used at the nose of the forming line to remove the excessive flakes between the paper overlay and the forming line belt.

The mat is then cut into a predetermined size for placing into press. The cut mats are then moved over the nose on the forming line (where the flakes are removed from the paper's surface using the air wands) and picked up by a screen embossed transfer mat. If appropriate, in the production of oriented strand board, the screen embossed transfer mat is sprayed with a release agent to keep the flakes from sticking to the press. However, given that there is a Kraft paper overlay between the flakes and the mat, the release agent is not needed. To prevent the wood mat from slipping off the transfer mat during acceleration, water is sprayed on the surface of the transfer mat prior to the transfer mat picking up the wood mat.

The screen embossed transfer mat and wood mat are then placed in a hot press at a temperature preferably greater than 360° F. for a period long enough to cure the binders on the wood flakes.

The transfer mat then moves the pressed master mat out of the press, removing the screen embossed transfer mat from the wood master mat, leaving an embossed pattern on the surface of the paper overlay. The embossed pattern has hills and valleys with a distance between the valleys and hills of preferably about 0.03048 cm (1/1000 inch) to about 0.3048 cm (10/1000 inch). The pattern is enough to provide needed skid resistance without puncturing the paper overlay, compromising the water-resistant quality of the panel.

Once the master mat is removed from the press, it can be cut into any dimension to meet the needs of the final user and the edges of the panels sealed with an edge seal coating.

It is understood by those skilled in the art that a continuous press could be used to manufacture overlay panels. One obvious change in the method would be that mastermats would be cut to size after leaving the press.

Use of Panel for Wall Sheathing

Figure 7:
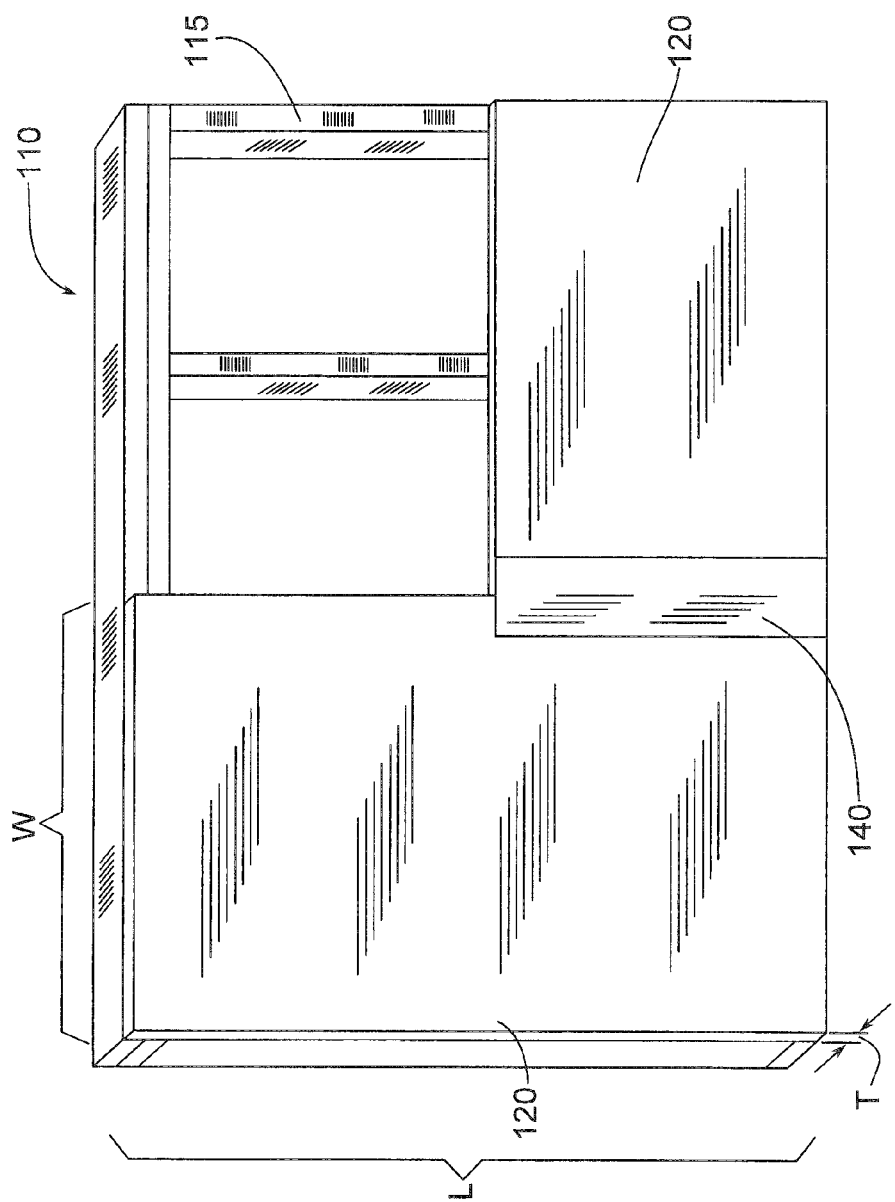
FIG. 7 is a perspective view of a three-dimensional wall sheathing system utilizing the panel according to another embodiment of the present invention showing adjacent wall panels with lengths of tape sealing the joints therebetween, each of the lengths of tape overlapping at least one of the joints.

According to an alternate embodiment of the present invention, FIG. 7 shows wall panels 120 joined to a building frame structure 115. Similar to the roof panels, the wall panels 120 have barrier layers bonded on one surface, and are generally attached to the building frame 115 in substantially abutting relationship with a plurality of fasteners such as nails, screws, or any other suitable fastener known on the art (not shown) so as to form joints therebetween. Also similar to the roof panel, the wall panel also preferably comprises a textured surface as described previously in the roof panel discussion.

Depending on the size of the panels 120 selected, the panels 120 may be installed with a horizontal or vertical orientation. In FIG. 7, panels 120 are installed vertically and horizontally and may typically be, but are not limited to a 1.219 m×2.438 m (4 ft.×8 ft.) construction. Additionally, a panel may be 1.219 m×3.048 m (4 ft.×10 ft.), 1.219 m×3.658 m (4 ft.×12 ft.), or of any desired size for the particular build.

As is well known in the field, the panels 120 may be structural, and may comprise a wood composite, such as veneers, strands, wafers, particles, fibers, and binders, or may be made from any building grade material as required for the particular build. The preferred dimensions of the wall panels 120, including the length L, width W, and thickness T of the panel may be designed to fit the particular application. Optionally, a one half inch thick panel T is used, however a 0.635 cm (quarter inch) to 3.175 cm (1.25-inch) thick panel 120 or thicker may be used if heavier construction is desired.

Figure 8:
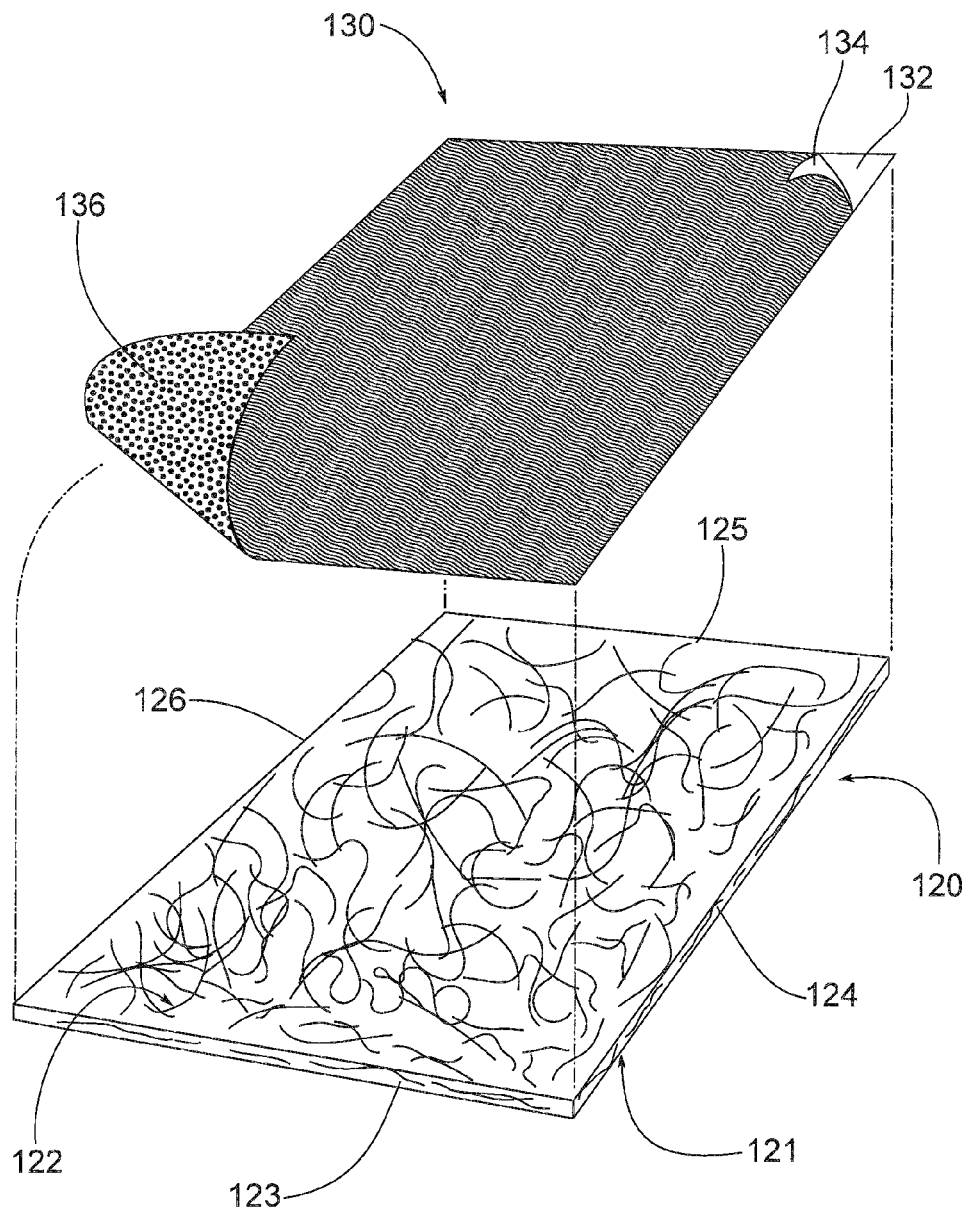
FIG. 8 is an exploded view of an embodiment of the structural panel according to the present invention and a view of the glueline for permanent bonding of the surface overlay member to the panel.
Figure 9A:
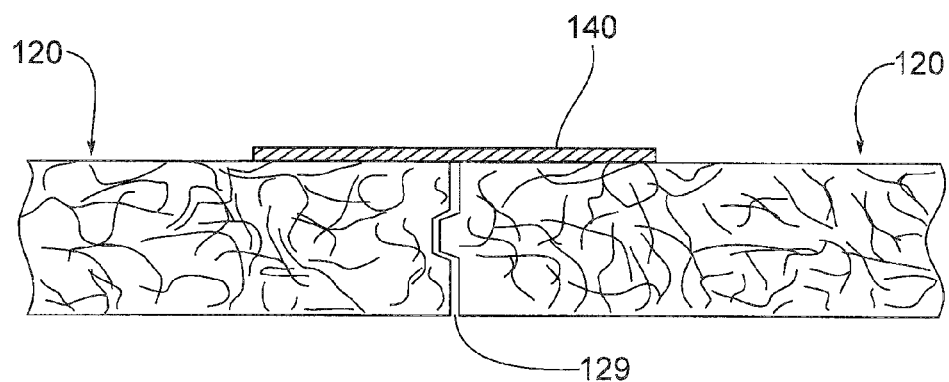
FIG. 9A is a partial cross-sectional view of two adjacent panels according to one embodiment of the present invention with tongue-and-groove connected panels after seam sealing.
Figure 9B:
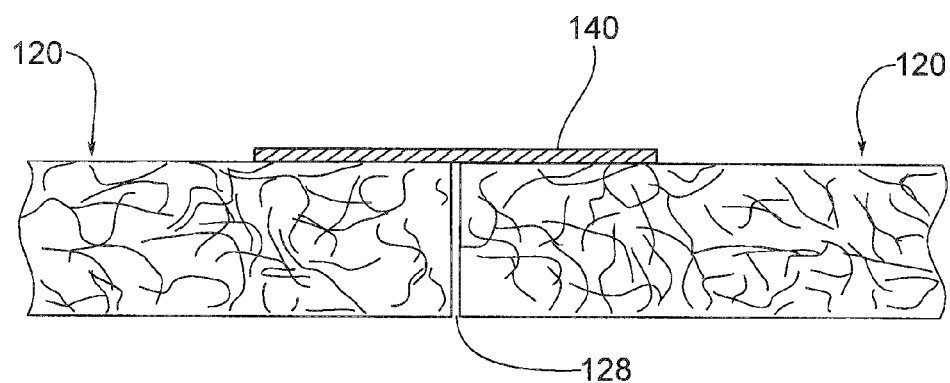
FIG. 9B is a cross-sectional view of two adjacent panels according to one embodiment of the present invention in a wall sheathing system with edge abutting connected panels after seam sealing.

Turning now to FIG. 8, the structural panels 120 are quadrilateral in shape comprising an inward facing surface 121, an outward facing surface 122 and a peripheral edge, the peripheral edge defining a first 123, second 124, third 125 and fourth 126 edge of the panel 120. The first edge 123 of the panel is parallel with the corresponding third edge 125 of the panel, each of the first 123 and third 125 edges having opposing sections of equal length, and the second edge 124 of the panel is parallel with the corresponding fourth edge 126 of the panel, each of the second 124 and fourth 126 edges having opposing sections of equal length. Further, the first 123 and third 125 edges of the panel are substantially perpendicular with adjacent second 124 and fourth 126 edges. As illustrated in FIG. 9A, one or more of the edges of the panel 120 may provide at least one tongue-and-groove 129 shape for joining and securing panels 120 together.

Where the tongue-and-groove configuration is utilized, opposing edges have a groove or tongue compatible with an opposing corresponding edge and the length of the tongue in each section measured in the longitudinal direction of an edge is less than or equal to the longest grooves in each section. However, as shown in FIG. 9B, the panels 120 may have flat surfaces 128 and be planar on all four peripheral edges 123, 124, 125, 126.

As depicted in FIG. 8, a barrier layer 130 is comprised of a paper 132 with at least two sides. During the construction stage of the panels 120, a barrier layer 130 is bonded to each panel 120 to form the barrier. Optionally, the bather layer 130 may comprise an UV-resistant overlay, a radiant reflective layer or the like. The barrier layer 130 is preferably comprised of three parts: paper 132, at least one of a resin 134 and a glueline layer 136, each of which may affect the durability and the final permeability of the panel 120. Preferably, the paper 132 has a paper basis weight of about 21.772 kg (48 lbs.) to about 102.058 kg (225 lbs.) per ream or a dry weight about 78.16 gm/m$^2$ (16 lbs./msf) to about 366.75 gm/m$^2$ (75 lbs./msf), however various basis weight papers 132 may be utilized for barrier layer 130. The paper 132 is preferably resin-impregnated with a resin 134 such as, but not limited to a phenol-formaldehyde resin, a modified phenol-formaldehyde resin, or other suitable resin. Preferably, the paper has a resin content in a range of about 0% to about 80% by dry weight. More preferably, the paper has a resin content in a range of about 20% to about 70% by dry weight. The resin 134 may be saturated on 152 and then partially cured 153 to the paper 132. This enables the paper 132 to retain the resin 134 and makes the resin-impregnated paper 132 easier to handle.

Further optionally, the barrier layer may comprise an applied coating layer. One such coating is an experimental acrylic emulsion coating from Akzo-Nobel. Another suitable coating is Valspar's Black Board Coating. It is understood that by those skilled in the art that other classes of coatings may serve as an appropriate barrier layer. Coatings may be used with paper overlays to add the desired functions to the panel.

An adhesive 136 is used to bond 155 the surface overlay member 130 to the outward facing surface of each of the plurality of panels 120. Optionally, the adhesive 136 is a glueline applied to 154 one side of the barrier layer 130 to facilitate attachment to the panels 120 during manufacture. Preferably, a glueline layer 136 is of a range from about 4.885 gm/m² (1 lbs./msf) to about 244.5 gm/m² (50 lbs./msf). More preferably, the glueline layer 136 has of a range from about 34.18 gm/m² (7 lbs./msf) to about 58.59 gm/m² (12 lbs./msf), creating a very efficient and durable bond. As mentioned previously, the glueline layer 136 may be composed from the group phenol-formaldehyde resin, hot-melt or PVA resin. Further optionally, the glueline layer may be isocynate-based.

As the plurality of resin-impregnated overlay bonded panels 120 are affixed to a building frame 115 in substantially abutting relationship, joints or seams are formed there between. Referring again to FIGS. 9A and 9B, enlarged cross sectional views of the system 110 show a plurality of strips of water-resistant pressure-sensitive seam sealant 140 for sealing the joints or seams between adjacent panels 120. Seam sealant 140 may, as understood by one in art, consist of laminate, caulk, foam, spray, putty, or other mechanical means. Preferably, a plurality of strips of permeable tape 140 are used to seal seams between adjacent panels 120.

The permeability of the tape used at the seams can be altered for the climatic zone (cold, mixed or hot/humid) and the building design used. In some climates in building designs, the tape may not need to be permeable since adequate permeability is available through the building envelope. In other climates in building designs, the tape will have to have a high level of permeability such that the moisture escapes from the interior spaces of the wall, and mold, fungus, etc. is not supported by the trapped moisture. Where a vapor barrier is required, the tape used will have a permeance of less than 1.0 US Perm.

In one example, the tape 140 is polyolefin (polyethylene preferred) backing of a thickness of about 2.5 mils to about 4.0 mils Adhesive (butyl preferred) layered deposed on said backing is of a thickness of about 8.5 mils. to about 30 mils Where a permeable barrier is required, the tape has water vapor permeance of greater than 1.0 US perm at 73° F.—50% RH via ASTM E96 procedure B) and possibly, as high as 200 US perms or more.

Whether the tape 140 is impermeable or permeable to water vapor, it must be able to resist liquid water from entering into the building envelope. Since the seam tape will need to seal against the liquid water as traditional house wraps do, it is reasonable to require the tape to meet standards currently employed to measure liquid water penetration through house wraps, as would be readily known by one skilled in the art.

The technologies that are used to make films or fabrics with water vapor permeance greater than 1.0 US Perm are well known. Tapes that have high permeance are often used in medical applications. Permeable tapes are made from a variety of processes and such tapes may be made bonding a pressure sensitive adhesive to a permeable layer. To improve strength, the permeable layer may be bonded to a woven or non-woven backing. Tapes may have in their structure permeable fabrics, coatings, membranes, or combinations thereof.

According to the preferred construction of the invention, the installation method 150 is shown in FIG. 10. The panels 120 are attached to the exterior facing sides of the building frame 115. The attachment pattern may be edge to edge, tongue-and-groove or any other appropriate construction alignment. Conventional fastening means such as nails, ring-shank nails, screws, or approved fastening means are used to attach the panel 120 to the frame 115. According to the invention, the structure is sealed by injecting, spreading or otherwise applying 157 a moisture proofing seam sealant to each seam between adjoining panels 120 so as to create an impervious seam. There is no need for the seam sealant to be flush with the exterior major panel surfaces or to bind it into the gap between the panels. Rather it is suggested that the seam sealant be applied over the exterior surfaces as shown in FIGS. 9A and 9B to assure that a sufficient seal occurs given possible panel thermal or strain cycling with changes in temperature or humidity. The seam sealant is of various lengths as required for the building.

The presently described panels may also comprise a radiant barrier material attached to the lower face of the panel, i.e., the face of the panel facing inwardly, toward the interior of the building. The radiant barrier material has a reflective surface that reflects infrared radiation that penetrates through the roof back into the atmosphere. The combination of this reflective function, as well as the foil's low emissivity, limits the heat transfer to the attic space formed in the interior of the building in the space under the roof. By limiting the heat transfer, the attic space temperature is reduced, which in turn reduces the cost of cooling the house.

The radiant barrier material may simply be a single layer radiant barrier sheet, such as metal foil, such as aluminum foil. Alternatively, the radiant barrier material may be composed of a radiant barrier sheet adhered to a reinforcing backing layer made from a suitable backing material, such as polymeric film, corrugated paper board, fiber board or kraft paper. The backing material makes the foil material easier and more convenient to handle. The multi-layered material may be a laminate in which a backing material is laminated to a radiant barrier sheet. Yet further alternatively, the radiant barrier may be a coating.

Both the radiant barrier material and the barrier layer can be applied to the panel by spreading a coat of adhesive to the surface of the panel, applying the heat-reflecting material (or the barrier layer) over the adhesive onto the panel and pressing the radiant barrier material (or barrier layer) onto the panel. After the adhesive dries or cures, the panel is ready for use.

Another embodiment of the panel of the present invention is a panel, useful for roof and wall sheathing, that has improved friction under some common conditions normally found on construction sites. Specifically, the panel of the presently described embodiment was designed to achieve improved skid-resistance. As described previously, when installing a roof, it is very important that the surface of the sheathing panels need to have sufficient skid resistance so that a person exercising reasonable care can work on the angled surfaces of the roof without slippage.

Although preferable for panels to remain dry during installation, on a construction site, the panels can be subject to moisture or wetness or have sawdust or other foreign materials deposited on their surface, which can reduce the coefficient of friction (CoF) and result in undesirable slippage. Sawdust is especially common on panel surfaces as panels often need to be cut to fit the roof properly. Sawdust can be a significant problem as it may cause a reduction in the coefficient of friction of the sheathing panel surfaces. Accordingly, it is desired to remove as much sawdust as possible from the panel surfaces prior to walking thereon. Although construction workers may take some efforts to clean the sawdust off the surface of the panels using a broom, tapping the board while on the edge, or using a leaf blower, these measures often prove to be inadequate. Specifically, these sawdust removal methods do not always completely remove the sawdust from the surface. Accordingly, a panel that restores adequate skid-resistance after removing as much sawdust as possible using any suitable means or method such as those described above is desired.

Improved performance after the removal of sawdust was achieved in either of two ways. The first method of improving performance and retaining adequate friction after the removal of sawdust is to use a saturating resin in the barrier layer which has a slightly higher fraction of volatiles. The percent volatiles can be a relative reflection of the average molecular weight of the saturating resin. Accordingly, a slight change in the percent volatiles can result in a measurable change in the depth of embossing achieved in the final cure. For example, about a 6% increase in volatiles (as measured in the present experimentation from 3.5% to about 3.7% of the total weight of the resin-saturated paper, including the glueline) resulted in improved embossing in that the measured depth of at least some of the embossed features was measured to be deeper. A thorough discussion of the overlay technology, including the measurement of volatiles, is found in U.S. Pat. No. 5,955,203.

The second method of improving the frictional characteristics of the panel after the removal of sawdust was to change the type of wood furnish used to manufacture the paper in the paper overlay. It was discovered that changing the furnish used in the manufacture of the barrier layer from the typically used hardwood species to softwood species improved the retaining of friction after removal of sawdust.

To measure the friction in the presence of sawdust for the present embodiment, the coefficient of friction was measured using the English XL Tribometer. The standard techniques for using this equipment are described in ASTM F1679-04 and "Pedestrian Slip Resistance; How to Measure It and How to Improve It." (ISBN 0-9653462-3-4, Second Edition by William English). The standard methods were used to compare the various test surfaces and conditions. To test the sheathing panels with sawdust, the amount of sawdust deposited on the surface of a panel near a saw cut was measured. The sawdust deposited on a panel surface was measured by placing sheets of paper on the surface of a panel and making cuts at the edge of the paper using a circular saw with a new blade. The amount of sawdust produced by the saw was under these conditions was 2.5 g/ft$^2$. The sawdust had a size distribution as shown in Table 6 (Runs 1-4: 20 g samples; Run 5: 60 g sample; all 15 min. on vibration screen shaker.) That amount of sawdust was applied to and spread across the test specimen surface evenly as possible, then the CoF was measured using the English XL Tribometer. The sawdust was removed by tilting on its edge and tapping it with a hammer to "knock" the sawdust off and the specimen's CoF in this state was then measured. The wet condition was measured according to the procedure described at pg. 173 in "Pedestrian Slip Resistance; How to Measure It and How to Improve It." Since CoF can change depending on the surface, water was added in doses of about 1.54 g of water per test strike until the CoF remained constant. The CoF was measured for several configurations of sheathing panels and compared to existing sheathing materials as controls. The data are reported in Table 5.

The overlay panel has a texture on the surface that imparts a satisfactory CoF on the exterior surface of the panel. As described previously in the prior described panel embodiment, the texture results from pressing a screen into the surface of the panel and comprised major channels and minor indentations. The screen pattern is not symmetric, but has large channels that are roughly orthogonal to much smaller channels that are inside the larger channels. Ideally, the larger channels run up and down and the smaller channels run side to side when the panel is installed on a roof. It was found that a small difference in CoF was measured depending on the test direction. The average of four measurements (N, E, S, and W) is reported and the testing shown in the following tables was initiated so that the first measurement was taken with respect to the textured surface. N and S is measured along the direction of the major channels and E and W is measured generally orthogonally with the major channels. It was noted that some very small differences in CoF could be measured depending on the axis (N-S vs. E-W) along which the measurements were taken. It is also expected that the conditions under which the test is conducted will have some affect on the measured CoF. Variations in temperature and humidity may also have an affect on the measured CoF.

The texture preferably has a number of features or elements disposed in a first direction and a number of features or elements disposed in a second direction. These elements or features disposed in first and second directions may be of similar or may be of different sizes. The elements similarly may be of different or of similar shapes. Non-limiting examples of similarly sized features include a embossed herringbone or a embossed basketweave configuration. A herringbone pattern may be very tightly disposed or may be somewhat "spread-out" in such a manner so that major channels with minor indentations are created.

The embossed textured surface preferably is more preferably comprised of a plurality of major or primary textured features and a plurality of minor or secondary textured features. Although the general appearance of the preferred textured surface 35 appears to be a random pattern of raised areas, however, a closer examination of the preferred textured surface reveals finer detail. Specifically, the preferred textured surface 35 includes a plurality of major channels 33 that are disposed substantially parallel with a pair of opposing edges (preferably the shorter pair of opposing edges) of the panel. Additionally, a plurality of minor indentations 34 are disposed within the major channels 33 and run generally orthogonally to the major channels. Although it is within the scope of the present invention to provide for advantageous slip-resistance by providing any number of major channels, preferably, the density of the major channels is about 5 to about 15 major channels per inch as measured in a direction perpendicular to the direction of the major channels. More preferably, the density of the major channels is about 9 to about 12 major channels per inch as measured in a direction perpendicular to the direction of the major channels. On a typical 4'×8' sheathing panel, the major channels will preferably run generally across the four-foot or short direction. It should be appreciated that it is not necessary nor required that the major channels be exactly parallel and may undulate slightly from side to side in a somewhat serpentine fashion rather than being straight.

Although it is within the scope of the present invention that the minor indentations 34 may vary in length and width, the minor indentations 34 have a preferably elongated shape that measures preferably about 0.0508 cm (0.020 inches) to about 0.254 cm (0.100 inches) in length and about 0.0254 cm (0.010 inches) to about 0.254 cm (0.100 inches) wide. Although it is within the scope of the present invention to provide for advantageous slip-resistance by providing any number of minor indentations, preferably, the density of the minor indentations is about 15 to about 35 of the minor indentations per inch as measured along the direction of the major channels. The long direction of the minor indentations preferably extends generally across the eight-foot (or long) direction of a typical panel.

In accordance with the preferred configuration of the textured surface 35, in a typical roof sheathing application using 1.219 m×2.438 m (4'×8') panels where the eight-foot edge of the sheathing panel is parallel to the floor of the home, the major channels 33 will generally be oriented up and down, while the long direction of the minor indentations 34 will generally run across the roof. Preferred depth of the major channels and minor indentations have been found to be in a range of about 5 to about 35 mils as measured by the Mitutoyo Surface Profiler. It should be appreciated that at least some of the major channels and minor indentations may be of a depth greater or deeper than the thickness of the paper (i.e. some of the major channels and minor indentations may be of a depth that would project into the surface of the panel).

For preparation of the test panels for the presently described embodiment, the overlay papers were bonded to mats in a primary process either in the lab or on the regular manufacturing line. Then, test specimens were cut from these panels. The conditions used to prepare the test panels in the laboratory were approximately: Press time: 5 minutes; Press temp: 200° C.; panel dimensions: 40.64 cm×40.64 cm×1.27 cm (16"×16"×0.5") thick; target density: 41.5 pcf; wood species: mixtures of pine; resin loading: face; MDI @ 4%; PPF@ 2% Core; MDI @ 4.5%; and wax loading: 2%.

TABLE 5

The CoF data for improved sheathing panels.

| Specimen | Condition | Average CoF | N-S CoF | E-W CoF |
|---|---|---|---|---|
| Softwood overlay paper | Dry | 0.83 | 0.79 | 0.87 |
| | Wet | 0.77 | 0.76 | 0.78 |
| | Sawdust | 0.48 | 0.47 | 0.47 |
| | After Sawdust | 0.85 | 0.77 | 0.92 |
| High volatiles overlay | Dry | 0.83 | 0.79 | 0.86 |
| | Wet | 0.82 | 0.83 | 0.81 |
| | Sawdust | 0.42 | 0.41 | 0.43 |
| | After Sawdust | 0.83 | 0.80 | 0.85 |
| OSB | Dry | 0.86 | 0.84 | 0.87 |
| | Wet | 0.80 | 0.80 | 0.80 |
| | Sawdust | 0.54 | 0.51 | 0.58 |
| | After Sawdust | 0.72 | 0.73 | 0.71 |
| Plywood | Dry | 1.0 | >1 | >1 |
| | Wet | 0.84 | 0.83 | 0.85 |
| | Sawdust | 0.53 | 0.54 | 0.52 |
| | After Sawdust | 0.62 | 0.61 | 0.63 |

The measurements in Table 5 were taken under conditions of higher temperature and humidity as compared with earlier described testing conditions.

TABLE 6

Particle size distribution of sawdust used to measure CoF.

| Sieve No. | Opening size (in microns) | Run #1 | Run #2 | Run #3 | Run #4 | Run #5 |
|---|---|---|---|---|---|---|
| 18 | 1000 | 0.19 | 0.21 | 0.19 | 0.18 | 0.47 |
| 30 | 600 | 0.6 | 0.83 | 0.68 | 0.58 | 2.17 |
| 60 | 250 | 3.44 | 4.57 | 3.42 | 3.40 | 9.90 |
| 80 | 180 | 3.53 | 3.15 | 2.98 | 2.72 | 8.76 |
| 100 | 150 | 1.30 | 2.52 | 4.28 | 1.17 | 3.10 |
| 140 | 106 | 4.71 | 5.13 | 3.23 | 2.32 | 9.78 |
| 200 | 75 | 1.12 | 1.54 | 1.79 | 2.28 | 6.48 |
| 325 | 45 | 4.07 | 1.55 | 4.11 | 3.87 | 10.79 |
| pan | 0 | 0.57 | 0.07 | 1.92 | 2.97 | 8.00 |

While the present invention has been described with respect to several embodiments, a number of design modifications and additional advantages may become evident to persons having ordinary skill in the art. While the illustrative embodiments have been described in considerable detail, it is not the intention of the applicant to restrict or in any way limit the scope of the appended claims.

What is claimed is:

1. A panel system to externally envelope a structure, the system comprising:
   at least two adjacent lignocellulosic panels, each panel including an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other;
   a barrier layer secured to the outer surface or the inner surface of each panel, the barrier layer being substantially bulk water resistant and substantially water vapor permeable, the barrier layer having an outer surface that is textured; and
   a bulk water resistant edge sealant sealing the joint between the proximate edges of the two adjacent panels, wherein the edge sealant includes strips of water-resistant tape having an adhesive layer and a backing, wherein the panel includes alignment guides for positioning of the water-resistant tape during installation,
   wherein the assembled panel system forms a sealed wall or roof of the structure without applying a separate moisture barrier layer of house wrap or felt paper.

2. The system of claim 1, wherein each panel and barrier layer has a water vapor transmission rate from about 0.7 to about 7 grams/m$^2$/24 hrs as determined by ASTM E96 procedure A (at 73° F.—50% RH) and a liquid water transmission rate from about 1 to about 28 grams/100 in$^2$/24 hrs via Cobb ring according to the test method described in ASTM D5795.

3. The system of claim 1, wherein the tape backing includes a polyolefin material.

4. The system of claim 1, wherein the tape includes a water vapor permeance of greater than 1.0 perm as determined by via ASTM E96 procedure B (at 73° F.—50% RH).

5. The system of claim 1, wherein the edge of one of the panels is a tongue and the edge of the adjacent panel is a groove.

6. The system of claim 1, wherein the textured outer surface provides a wet coefficient of friction in a range of about 0.8 to about 1.1 (English XL Tribometer) and a dry coefficient of friction of at least about 0.8 (English XL Tribometer).

7. The system of claim 1, wherein the edge sealant includes a liquid sealant.

8. A panel system to externally envelope a structure, the system comprising:
   at least two adjacent lignocellulosic panels, each panel including an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other;
   a barrier layer secured to the outer surface or the inner surface of each panel, the barrier layer being substantially bulk water resistant and substantially water vapor permeable, wherein the barrier layer includes a resin-impregnated paper substantially covering the outer surface of the panel, the resin-impregnated paper having a paper basis weight of 21.772 kg (48 lbs.) to about 102.058 kg (225 lbs.) per ream and a resin content of less than 80% by dry weight, and wherein the barrier layer has an outer surface that is textured; and a bulk water resistant edge sealant sealing the joint between the proximate edges of the two adjacent panels, wherein the edge sealant includes strips of water-resistant tape having an adhesive layer and a backing, wherein the panel includes alignment guides for positioning of the water-resistant tape during installation, wherein the assembled panel system forms a sealed wall or roof of the structure without applying a separate moisture barrier layer of house wrap or felt paper.

9. A method of externally sheathing a building structure, the method comprising:
obtaining at least two panel assemblies, each panel assembly including
a lignocellulosic panel including
an outer surface;
an inner surface;
and at least one edge; and
a barrier layer secured to the outer surface of each panel, the barrier layer being substantially bulk water resistant and substantially water vapor permeable, and the barrier layer having an outer surface that is textured;
positioning the panel assemblies adjacent to each other such that the respective edges are proximate and substantially parallel to each other to define a longitudinal joint therebetween and such that the respective inner surfaces contact the structure;
fastening each panel assembly to the structure; and
sealing the longitudinal joint between the edges of the adjacent panels by applying strips of adhesive-backed water-resistant tape to one of the panel outer surface and the barrier-layer outer surface, including removing a backing of the water-resistant tape to expose an adhesive layer of the water-resistant tape, positioning the water-resistant tape using alignment guides of the adjacent panels, and applying the adhesive layer to the adjacent panels covering the longitudinal joint,
wherein the resulting assembled sealed panel system forms a sealed wall or roof of the structure without applying a separate moisture barrier layer of house wrap or felt paper.

10. The method of claim 9, wherein the barrier layer includes a resin-impregnated paper substantially covering the outer surface of the panel, the resin-impregnated paper having a paper basis weight of 21.772 kg (48 lbs.) to about 102.058 kg (225 lbs.) per ream and a resin content of less than 80% by dry weight.

11. The method of claim 9, wherein each panel assembly has a water vapor transmission rate from about 0.7 to about 7 grams/m$^2$/24 hrs as determined by ASTM E96 procedure A (at 73° F.—50% RH) and a liquid water transmission rate from about 1 to about 28 grams/100 in$^2$/24 hrs via Cobb ring according to the test method described in ASTM D5795.

12. The method of claim 9, wherein the edge of one of the panels includes a tongue, the edge of the adjacent panel includes a groove, and the step of positioning each panel along the structure includes positioning the tongue proximate the groove.

13. The method of claim 9, the step of positioning each panel along the structure includes positioning the edge of one of the panels a distance away from the edge of the adjacent panel to allow for expansion and contraction of each panel.

14. The method of claim 9, wherein sealing the joint between the edges of the panels includes applying a liquid sealant to one of the outer surface and the barrier layer.

* * * * *